(12) United States Patent
Martignoni et al.

(10) Patent No.: US 8,676,628 B2
(45) Date of Patent: Mar. 18, 2014

(54) METHOD AND SYSTEM FOR DETERMINING EFFECTIVENESS OF MARKETING

(75) Inventors: Michelle Martignoni, Point Piper (AU); Florencia Tarelli, Pyrmont (AU)

(73) Assignee: Roil Results Pty Limited, Bellevue Hill (AU)

( * ) Notice: Subject to any disclaimer, the term of this patent is extended or adjusted under 35 U.S.C. 154(b) by 0 days.

(21) Appl. No.: 13/395,440

(22) PCT Filed: May 18, 2010

(86) PCT No.: PCT/AU2010/000586
§ 371 (c)(1),
(2), (4) Date: Apr. 12, 2012

(87) PCT Pub. No.: WO2011/029125
PCT Pub. Date: Mar. 17, 2011

(65) Prior Publication Data
US 2012/0197712 A1    Aug. 2, 2012

Related U.S. Application Data

(60) Provisional application No. 61/276,487, filed on Sep. 11, 2009.

(51) Int. Cl.
*G06Q 10/00* (2012.01)

(52) U.S. Cl.
USPC ....................................................... 705/7.29

(58) Field of Classification Search
USPC ........................................................ 705/7.29
See application file for complete search history.

(56) References Cited

U.S. PATENT DOCUMENTS

| | | | |
|---|---|---|---|
| 5,041,972 A * | 8/1991 | Frost | 705/7.32 |
| 5,227,874 A * | 7/1993 | Von Kohorn | 705/7.32 |
| 6,322,368 B1 * | 11/2001 | Young et al. | 434/236 |
| 6,826,541 B1 * | 11/2004 | Johnston et al. | 705/36 R |
| 6,839,681 B1 * | 1/2005 | Hotz | 705/14.41 |
| 6,934,748 B1 * | 8/2005 | Louviere et al. | 709/224 |
| 7,031,888 B2 * | 4/2006 | Astorino | 703/1 |
| 7,103,561 B1 * | 9/2006 | Sarkisian et al. | 705/7.31 |
| 7,219,068 B2 * | 5/2007 | Zelek et al. | 705/7.29 |
| 7,308,497 B2 * | 12/2007 | Louviere et al. | 709/224 |

(Continued)

FOREIGN PATENT DOCUMENTS

| | | |
|---|---|---|
| WO | 0235422 A2 | 5/2002 |
| WO | 02/48838 A2 | 6/2002 |
| WO | 2007/025338 A1 | 3/2007 |
| WO | 2009/015439 A1 | 2/2009 |

OTHER PUBLICATIONS

Hai, Lili et al., An Integrated Framework for the Design of Optimal Web Banners Netnomics, vol. 11, 2010.*

(Continued)

*Primary Examiner* — Scott L Jarrett
(74) *Attorney, Agent, or Firm* — Franklin & Associates International; Matthew F. Lambrinos

(57) ABSTRACT

A computer based system (1,5) for measuring the effectiveness of a marketing element for a product is disclosed. It has an apparatus (1) comprising one or more computing processes (30, 32, 34, 36) for determining how well a product and/or marketing element measures against each one of one or more consumer perceived benefits (15) that consumers seek through purchase and/or consumption of the product.

32 Claims, 4 Drawing Sheets

(56) References Cited

U.S. PATENT DOCUMENTS

| | | | |
|---|---|---|---|
| 7,624,069 B2* | 11/2009 | Padgette | 705/39 |
| 7,729,940 B2* | 6/2010 | Harvey et al. | 705/7.31 |
| 7,778,872 B2* | 8/2010 | Kamangar et al. | 705/14.52 |
| 7,818,208 B1* | 10/2010 | Veach | 705/14.49 |
| 7,921,025 B2* | 4/2011 | Shan | 705/7.31 |
| 8,015,140 B2* | 9/2011 | Kumar et al. | 706/46 |
| 8,131,732 B2* | 3/2012 | Yu et al. | 707/748 |
| 8,151,292 B2* | 4/2012 | Lee et al. | 725/12 |
| 8,190,486 B1* | 5/2012 | Ouimet | 705/26.1 |
| 8,200,527 B1* | 6/2012 | Thompson et al. | 705/7.39 |
| 8,230,457 B2* | 7/2012 | Lee et al. | 725/10 |
| 8,234,146 B2* | 7/2012 | Mittal et al. | 705/7.29 |
| 8,255,263 B2* | 8/2012 | Smallwood | 705/7.29 |
| 8,301,483 B2* | 10/2012 | Sunvold | 705/7.29 |
| 8,347,326 B2* | 1/2013 | Weitzenfeld et al. | 725/24 |
| 8,473,044 B2* | 6/2013 | Lee et al. | 600/544 |
| 2002/0184082 A1* | 12/2002 | Nakano et al. | 705/10 |
| 2002/0184083 A1* | 12/2002 | Nakano et al. | 705/10 |
| 2003/0040954 A1* | 2/2003 | Zelek et al. | 705/10 |
| 2003/0126146 A1* | 7/2003 | Van Der Riet | 707/100 |
| 2003/0195793 A1* | 10/2003 | Jain et al. | 705/10 |
| 2004/0059626 A1* | 3/2004 | Smallwood | 705/10 |
| 2004/0204983 A1* | 10/2004 | Shen et al. | 705/10 |
| 2004/0234932 A1* | 11/2004 | Hughes et al. | 434/236 |
| 2005/0096943 A1 | 5/2005 | Siegalovsky et al. | |
| 2006/0116930 A1* | 6/2006 | Goldstein | 705/14 |
| 2007/0016488 A1 | 1/2007 | Ulenas | |
| 2007/0260521 A1* | 11/2007 | Van Der Riet | 705/14 |
| 2008/0091854 A1* | 4/2008 | Minoshima et al. | 710/29 |
| 2008/0183632 A1* | 7/2008 | Gazetova et al. | 705/80 |
| 2008/0215417 A1* | 9/2008 | Young | 705/10 |
| 2009/0076335 A1* | 3/2009 | Schwarzberg et al. | 600/300 |
| 2010/0094702 A1* | 4/2010 | Silberstein | 705/14.43 |
| 2010/0100419 A1* | 4/2010 | Natoli et al. | 705/10 |
| 2010/0131356 A1* | 5/2010 | Stevens et al. | 705/14.44 |
| 2010/0145953 A1* | 6/2010 | Charles et al. | 707/748 |
| 2011/0072448 A1* | 3/2011 | Stiers et al. | 725/10 |
| 2011/0119126 A1* | 5/2011 | Park et al. | 705/14.45 |
| 2011/0202404 A1* | 8/2011 | van der Riet | 705/14.41 |
| 2012/0002848 A1* | 1/2012 | Hill | 382/118 |
| 2012/0004983 A1* | 1/2012 | Borthwick et al. | 705/14.45 |
| 2012/0130800 A1* | 5/2012 | Pradeep et al. | 705/14.41 |
| 2012/0290950 A1* | 11/2012 | Rapaport et al. | 715/753 |
| 2013/0041750 A1* | 2/2013 | Ye et al. | 705/14.52 |

OTHER PUBLICATIONS

Louviere, Jordan J. et al., A comparison of importance weights and willingness to pay measures derived from choice-based conjoint, constant sum scales and best-worst scaling, Journal of Business Research, vol. 61, 2008.*

Louivere, Jordan et al., Conjoint analysis modeling of stated preferences Journal of Transport Economics, vol. 22, No. 1, Jan. 1988.*

Li Suke et al., Exploiting Consumer Reviews for Product Feature Ranking SWSM'11, Jul. 28, 2011.*

Sparkman, Richard M. et al., Attribution Theory and Advertising Effectiveness Journal of Consumer Research, Vo. 7, No. 3, Dec. 1980.*

Bakken, David et al., Chapter 15—Conjoint Analysis: Understnding Consumer Decision Making Date Unknown.*

Evans, "Measuring and managing customer value", Work Study, vol. 51 No. 3, pp. 134-139, 2002 MCB UP Ltd.

Ulaga et al., "Measuring Customer-Perceived Value in Business Markets", Industrial Marketing Management 30, 525-540 (2001) 2001 Elsevier Science Inc. 655 Avenue of the Americas, New York, NY 10010.

Harmon et al., "Linking Marketing Strategy to Customer Value: Implications for Technology Marketers", 1992.

ISA—Australian Patent Office, Written Opinion of the International Search Authority, dated Jun. 21, 2010, issued on International Patent Application No. PCT/AU2010/000586 filed May 18, 2010.

* cited by examiner

METHOD AND SYSTEM FOR DETERMINING EFFECTIVENESS OF MARKETING

CROSS REFERENCE TO RELATED APPLICATIONS

This application claims the benefit under 35 U.S.C §119(e) of U.S provisional patent application No. 61/276,487, which was filed on Sep. 11, 2009.

FIELD OF THE INVENTION

The present invention relates generally to a method and system for determining the effectiveness of a marketing element, and, particularly, but not exclusively, to a method and system for determining the return on investment of a marketing element or a combination of marketing elements.

BACKGROUND OF THE INVENTION

Market perception of any product may be influenced by marketing elements such as the brand, packaging, advertising (TV or any other media), events, promotions and more. Marketing elements, such as those mentioned, are intended to generate a response from consumers that will (hopefully) eventually lead to sales of the product.

A problem with the provision of marketing elements, is that there is no way at present of accurately quantifying their effectiveness at delivering product sales. Marketing elements may generate an unconscious emotional response from a consumer that will eventually lead to sales of a product. Presently, however, it is very difficult to measure this response. If one was to ask a consumer how much they were affected by an advertisement, it is extremely unlikely that they would be able to provide an accurate response, because absorption of the advertising message and its resultant effect on their purchase of the product happens unconsciously.

Marketing personnel that are charged with the responsibility of converting marketing elements into product sales are typically unable to measure the outcome. This may result in organizations not knowing how much of their investment budget to allocate to marketing in order to convert it to the best possible return on that investment, especially over the long term.

It is known, to attempt to correlate marketing spend and sales. This marketing return on investment method is generally known as Market Mix Modeling. Because it only analyses marketing spend and sales, however, it is frequently erroneous or incomplete. It fails to make any measure of the effectiveness of any marketing element on the (often unconscious) consumer response that may eventually lead to sales.

Consumer perceived benefits are those generally unconscious benefits that a consumer perceives they are obtaining from purchase and/or consumption of the product. For example, a consumer perceived benefit associated with the product category Vodka, is that of "socialization" i.e. how effectively consumers feel a Vodka product facilitates social interaction. There are other consumer perceived benefits for Vodka. Consumer perceived benefits vary from product category to product category.

In this specification the term "product" encompasses a particular good and/or service associated with one or more marketing elements. Examples of a product is the soft drink marketed as "Coca-Cola" (™), the alcoholic beverage marketed as "Johnnie Walker" and the car marketed as "Aston-Martin DB9". The term "marketing element" includes the brand (e.g. trade marks or the logo), packaging, finished advertising (in any media), promotions, events, innovations (e.g. new brands, sub brands or line extensions) and anything else that is associated with the promotion of a product, as well as unfinished branding, packaging, ideas, concepts, advertising (in any media) and anything else that is intended to promote a product in the future. In this specification, the term "product category" encompasses a set of related products.

SUMMARY OF INVENTION

According to a first aspect of the invention there is provided a method of measuring the effectiveness of a marketing element for a product, the method comprising the step of determining how well the product and/or marketing element measures against each of one or more consumer perceived benefits that consumers seek through purchase and/or consumption of the product.

This embodiment of the present invention measures the effectiveness of a marketing element by making a determination as to how well the marketing element measures against the consumer perceived benefits (CPBs) associated with the product. This has the advantage that the affect of a marketing element (such as the brand, packaging, advertising etc) on the unconscious consumer perceived benefit is quantified. This is a direct measure of how the marketing element measures against the consumer. No one has done this before, and it has advantages over previous methods, such as Market Mix Modeling, which merely mathematically analyze the correlation between marketing spend and sales.

Typically it is not possible for a consumer to articulate how the CPB is affected by a particular marketing element because CPBs are generally unconscious. This is a significant problem with identifying the effectiveness of the marketing element.

In an embodiment, the step of determining how well the product and/or marketing element measures against a CPB comprises the step of selecting expressions for each of the one or more CPBs, by obtaining expression rating data representing a consumer perceived rating of how well the expression represents a CPB.

An "expression" in this context is an unbranded representation of a CPB, and it can take many forms. Non-limiting examples include pictures, text, audio stimulus, moving footage audio-visual stimulus, smells, taste, textures and other expressions.

Using the expression rating data, in embodiments of the invention the preferred expressions of consumers for one or more CPBs can be identified.

An advantage of identifying expressions is that, although a consumer can't articulate directly how well a product and/or marketing element satisfies a CPB, they can articulate how well a product and/or marketing element compares with an expression of the CPB, that consumers previously selected as being a good representation of the CPB. This enables the product and/or marketing element to be rated against the CPB, in accordance with embodiments of the present invention.

In an embodiment, the expression rating data is obtained from consumer surveys, where one or more expressions are presented to consumers and the consumers input their rating (which will generally be a number) of how the expression represents the particular CPB. Expressions are therefore presented to consumers and ratings received. In an embodiment, this is done via a computer system, such as a networked computer system, such as the Internet, for example. In an embodiment, alternatively or additionally, the expressions are received from a database of expressions.

In an embodiment, the step of determining how well the product and/or marketing element measures against each of one or more CPBs, comprises the further step of obtaining product and/or marketing element rating data by rating how well a product and/or marketing element represents one or more of the selected expressions (that represent the CPBs). The product and/or marketing element rating data, in an embodiment, is obtained via surveys of consumers who may have previously provided expression rating data to select expressions which represent CPBs. In this way, the product and/or marketing element rating data is matched against the selected expressions, which have been rated as far as they represent a CPB. This advantageously provides a quantifiable measure of how a product and/or marketing element rates with respect to a CPB. From this, the effectiveness of the product and/or marketing element can therefore be quantified.

In an embodiment, the product and/or marketing element rating data is obtained via use of a computer system, such as a networked computer system, such as the Internet for example.

In an embodiment, the method comprises the step of determining a measure of importance for each of the one or more consumer perceived benefits. The step of determining the importance may comprise the step of performing an analysis of products and/or marketing elements rating data and liking and/or loyalty and/or consumption and/or purchase data of corresponding products and/or marketing elements. The step of performing an analysis may comprise the step of performing a statistical analysis. The step of performing a statistical analysis may comprise determining a correlation between the products and/or marketing elements rating data and the liking/loyalty/consumption/purchase data, the degree of correlation being indicative of the importance of the consumer perceived benefit to the liking/loyalty/consumption/purchase of the products and/or marketing elements in question. The step of determining a correlation may comprise the step of performing a regression analysis. The step of performing a regression analysis may comprise the step of performing a partial least squares regression analysis.

Once a measure of importance for each of the one or more consumer perceived benefits is determined it is possible to compare the benefits of the product and/or marketing element extolled and the importance of each of those benefits as perceived by a consumer. Consequently, it is possible to use the measure of importance to determine if the extolled benefits are indeed the important ones, or to craft a product and/or marketing element that extols benefits that are perceived as important to the consumer and thus effective.

In an embodiment, the analysis is confined to data derived from consumers with similarities, such as similar purchase and/or consumption habits and similar demographics. In this case, what is important to a specific group can be determined, which may better inform those marketing to the group.

In an embodiment, the method may comprise the further step of determining a measure of influence of each of the one or more consumer perceived benefits in driving the liking/loyalty/consumption/purchase of a product and/or marketing element. The step of determining may comprise one or more of the steps of performing an analysis of the importance of each of the one or more consumer perceived benefits, a product's and/or marketing element associated with that product's performance on the consumer perceived benefits and the liking/loyalty/consumption/purchase data of the product and/or marketing element.

In an embodiment, the method comprises the step of weighting the importance of each of the one or more consumer perceived benefits by the performance of a product and/or marketing element associated with that product on each of the respective one or more consumer perceived benefits to obtain the product's and/or marketing element's weighted consumer perceived benefits data. This may, in some embodiments, assist in determining the measure of influence for each of the consumer perceived benefits in generating a product's and/or marketing element's liking/loyalty/consumption/purchase.

In an embodiment, the step of determining a measure of influence comprises the step of an analysis of how much the consumer perceived benefits drive liking/loyalty/consumption/purchase of the product and/or marketing element. The analysis may comprise a statistical analysis. The analysis may comprise determining a correlation between the product's and/or marketing element's weighted consumer perceived benefits data and the product's and/or marketing element's liking/loyalty/consumption/purchase data. The correlation analysis may comprise the step of performing a regression analysis. The step of performing a regression analysis may comprise the step of performing a partial least squares regression analysis.

In an embodiment, the method comprises receiving the liking/loyalty/purchase/consumption data indicative of the liking/loyalty/purchase/consumption level of each of the plurality of consumers to a plurality of products and/or marketing elements. The liking/loyalty/purchase/consumption data may be received from a survey of consumers. Alternatively or additionally, the liking/loyalty/purchase/consumption data is received from a database.

In some embodiments the method comprises the step of determining the proportion of product sales that are attributable to the marketing element. This may be by way of implementation of a statistical calculation utilising the expression rating data and/or the product and/or marketing element rating data and/or liking/loyalty/purchase/consumption data, the step of measuring the importance of the consumer perceived benefits, the step of weighting each CPB's importance by the product and/or marketing element in question's performance on each of the CPBs and the step of determining the measure of influence of each of the consumer perceived benefits in generating liking/loyalty/purchase/consumption. The statistical process implemented may be a regression analysis. The step of performing a regression analysis may comprise the step of performing a partial least squares regression analysis.

In an embodiment, the method comprises the further step of implementing a computer process to calculate the return on investment of a marketing element. This may be by way of implementation of a mathematical calculation utilizing the proportion of product sales that are attributable to the marketing element and the client or product owner's sales, revenue, profit, investment and/or cost data. This may comprise a direct measure of the effectiveness of a marketing element. The mathematical calculation may be a division of revenue or profit attributed to the marketing element divided by the marketing element's investment or cost.

Other inputs to the method may also be included. For example, inputs may include the surveyed consumers' exposure (versus non-exposure) to a marketing element, each consumer's ability to correctly (versus non correctly) identify the brand that the marketing element was aimed at; the amount of each product that is purchased and/or consumed in a given period; the level of liking/loyalty towards each product and/or marketing element; production and costs of each marketing element; total sales of the product, and/or other inputs.

In an embodiment, the computer process implements a mathematical analysis utilizing a statistical technique called regression to determine outputs such as the importance of the consumer perceived benefits in driving liking/loyalty/purchase/consumption of the product and/or marketing element, the influence of each of the consumer perceived benefits in driving a particular product's and/or marketing element's liking/loyalty/purchase/consumption and the effect of each of the marketing elements in driving a particular product's and/or marketing element's liking/loyalty/purchase/consumption and hence product sales and return on investment.

As well as the outputs mentioned, the identification of the expressions and comparison of the expressions with the product and/or marketing elements can result in feedback to a product owner to enable them to improve their products and/or marketing elements (e.g. so they become better matched with the expressions that have been identified as best representing the CPBs required for the particular product).

In an embodiment, the determined measure of the product and/or marketing element against each of one or more consumer perceived benefits is used to adapt the product and/or marketing element. This may improve the product and/or marketing element so adapted.

In an embodiment, the determined measure of the product and/or marketing element against each of one or more consumer perceived benefits is used in the design of the product and/or marketing element. This may result in a highly effective product and/or marketing element.

In accordance with a second aspect, the present invention provides a computer program comprising instructions for controlling a computer to implement a method in accordance with the first aspect of the invention.

In accordance with a third aspect, the present invention provides a computer readable medium providing a computer program in accordance with the second aspect of the invention.

In accordance with a fourth aspect, the present invention provides a computer based system for measuring the effectiveness of a marketing element for a product, comprising an apparatus comprising one or more computing processes for determining how well a product and/or marketing element measures against each one of one or more consumer perceived benefits that consumers seek through purchase and/or consumption of the product.

In an embodiment, the computer based system comprises an expression rating data unit adapted to obtain expression rating data representing a consumer rating of how well one or more expressions satisfy one or more of the consumer perceived benefits.

In an embodiment, the expression rating data unit is adapted to facilitate a consumer survey over a computer network, the survey presenting one or more expressions to consumers and obtaining a rating from the consumers as to how well the expressions represent a consumer perceived benefit. In an embodiment, alternatively or additionally, the expressions are received from a database of expressions.

In an embodiment, the computer based system comprises a product and/or marketing element rating data unit adapted to obtain product and/or marketing element rating data representing a consumer perceived rating of how well the product and/or marketing element measures against one or more expressions of each of the consumer perceived benefits.

In an embodiment, the product and/or marketing element rating data unit is adapted to facilitate a consumer survey over a computer network, the survey presenting to consumers the product and/or marketing element and receiving input from the consumer as to how well the product and/or marketing element measures against the expressions.

In an embodiment, the computer-based system comprises a category performance data generator adapted to determine a measure of importance for each of the one or more consumer perceived benefits. The category performance data generator may comprise a category performance analyser for performing an analysis of product and/or marketing element rating data and liking/loyalty/consumption/purchase data of corresponding products and/or marketing elements. The analyser may be adapted to perform a statistical analysis. The statistical analysis may comprise determining a correlation between the product and/or marketing element rating data and the liking/loyalty/consumption/purchase data, the degree of correlation being indicative of the degree of importance. The degree of importance of the consumer perceived benefit may be towards the liking/loyalty/consumption/purchase of the products and/or marketing elements in question. The analyser may be adapted to perform a regression analysis. The analyser may be adapted to perform a partial least squares regression analysis.

In an embodiment, the analyser is adapted to confine the analysis to data derived from consumers with similarities. Non-limiting examples include similarities in brand choice and/or demographic similarities.

In an embodiment, the computer based system comprises a product and/or marketing element liking/loyalty/consumption/purchase data generator adapted to determine a measure of influence of each of the one or more consumer perceived benefits in driving the liking/loyalty/consumption/purchase of the product and/or marketing element. The product and/or marketing element liking/loyalty/consumption/purchase data generator may comprise a product and/or marketing element liking/loyalty/consumption/purchase analyser adapted to perform an analysis of the importance of each of the one or more consumer perceived benefits, the performance of the product and/or marketing element associated with the product on the consumer perceived benefits and the liking/loyalty/consumption/purchase data of the product and/or marketing element.

In an embodiment, the computer based system comprises a weighter adapted to weight the importance of each of the one or more consumer perceived benefits by the performance of the product or marketing element associated with the product on the consumer perceived benefits, to obtain the weighted consumer perceived benefits data for the product and/or marketing element.

In an embodiment, the product and/or marketing element liking/loyalty/consumption/purchase analyser is adapted to perform an analysis of the correlation between the weighted consumer perceived benefits data and the liking/loyalty/consumption/purchase data of the product and/or marketing element, the degree of correlation being indicative of the degree of influence of the weighted consumer perceived benefits towards the liking/loyalty/consumption/purchase of the product and/or marketing element in question. The product and/or marketing element liking/loyalty/consumption/purchase analyser may be adapted to perform a regression analysis. The product and/or marketing element liking/loyalty/consumption/purchase analyser may be adapted to perform a partial least squares regression analysis.

In an embodiment, the computer based system may comprise a liking/loyalty/consumption/purchase data receiver adapted to receive the liking/loyalty/consumption/purchase data indicative of the liking and/or loyalty and/or consumption and/or purchase level of each of the plurality of consumers to a plurality of products and/or marketing elements. In an embodiment, the receiver obtains the data by facilitating a consumer survey over a computer network. In an embodiment, the receiver is adapted to receive the data from a database of liking/loyalty/consumption/purchase data.

In an embodiment, the computer based system comprises a marketing elements product sales data generator.

In an embodiment, the computer based system comprises a marketing elements product return on investment data generator.

In an embodiment, the measure of the product and/or marketing element against each of one or more consumer perceived benefits determined by the computer based system is used to adapt the product and/or marketing element.

This may improve the product and/or marketing element so adapted.

In an embodiment, the measure of the product and/or marketing element against each of one or more consumer perceived benefits determined by the computer based system is used in the design of the product and/or marketing element. This may result in a highly effective product and/or marketing element.

The term "server" in this specification is intended to encompass any combination of hardware and software that performs services for connected clients in part of a client-server architecture. The client and a server may be separate software running on a single piece of hardware or a plurality of connected pieces of hardware.

The memory in this embodiment comprises one or more of CPU registers, on-die SRAM caches, external caches, DRAM and/or, paging systems, virtual memory or swap space on the hard drive, or any other type of memory. However, embodiments may have additional or less memory types as suitable.

BRIEF DESCRIPTION OF THE FIGURES

Features and advantages of the present invention will become apparent from the following description of embodiments thereof, by way of example only, with reference to the accompanying drawings, in which.

DETAILED DESCRIPTION OF EMBODIMENTS OF THE INVENTION

An embodiment of the present invention determines the relationship between a marketing element and the unconscious persuasion of the marketing element on consumers. Unconscious persuasion may result in liking/loyalty/consumption/purchase of the product and/or marketing in question and thus marketing element performance may be estimated. In some embodiments, the financial return on the marketing investment may then be determined.

Some embodiments determine how well a product and/or marketing element measures against each of one or more consumer perceived benefits that consumers seek through purchase, and possibly consumption, of the goods or service in question.

Figure 1:
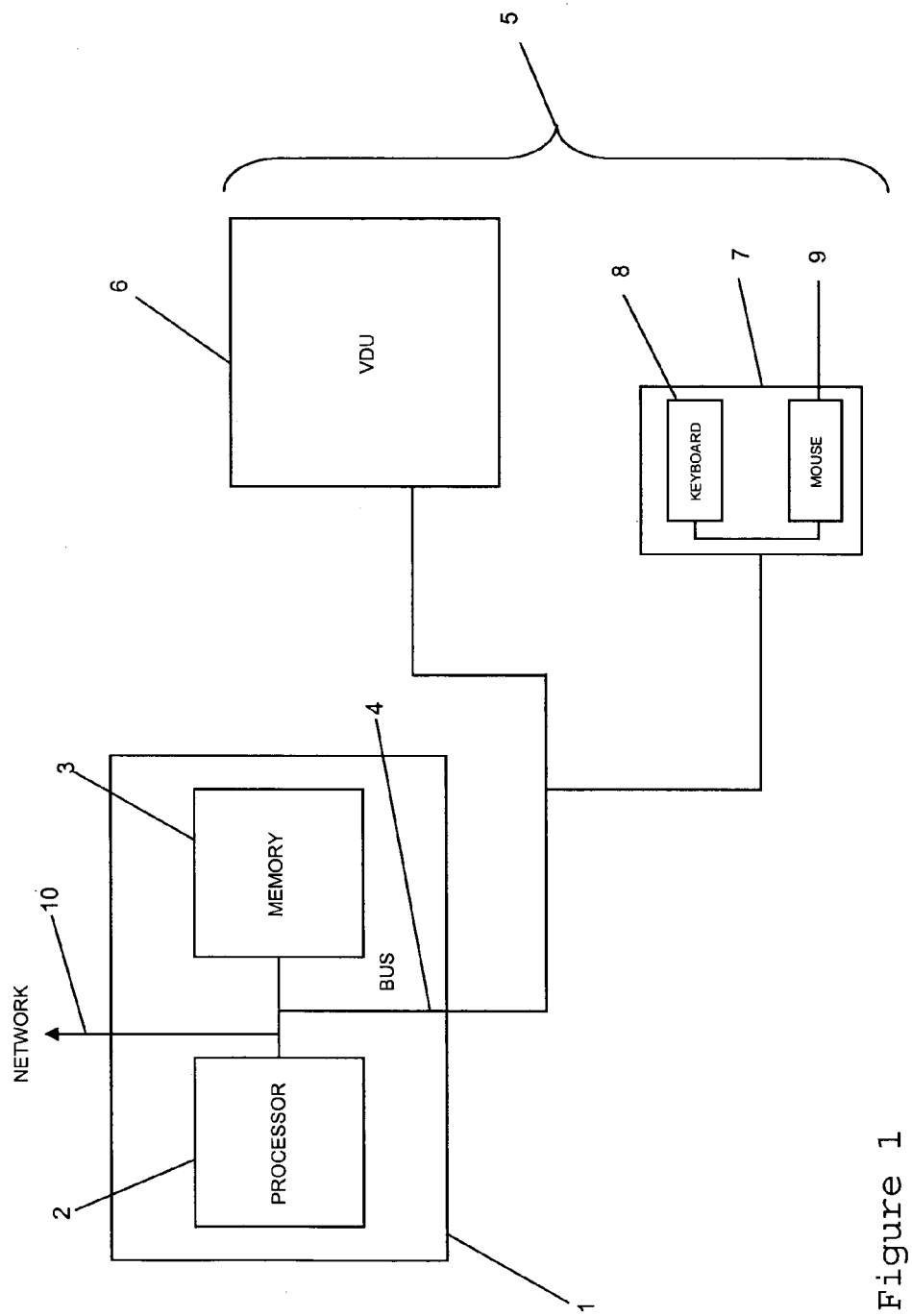
FIG. 1 is a schematic diagram of an embodiment of a machine configured to perform at least part of one aspect of the invention.

FIG. 1 is a schematic block diagram of an example machine which may be used for implementation of a method and system in accordance with an embodiment of the present invention. The machine may, for example, assist in implementing a survey of a plurality of consumers to generate at least some of the input data. It may alternatively receive input data from other sources such as databases. The machine (or another of a similar configuration, for example) may perform the algorithm and then present or send the results.

The illustrated machine, in this embodiment a computing system, comprises a computer 1 which includes a processor 2 and memory 3. The processor 2 is arranged to process programme instructions specifying the algorithm and data in a known manner. Memory 3 is arranged to store programme instructions and data also in a known manner. Processor 2 may constitute one or more processing means, such as integrated circuit processors. The memory 3 may comprise any known memory architecture and may include hard disk, IC memory (ROM, PROM, RAM, etc), floppy disks and other types of additional memory such as CD ROM, and any other type of memory.

A BUS 4 is provided for communication between the processor 2 and memory 3 and also communication with external components. In this case the external components include a user interface 5. The user interface 5 includes a visual display unit (VDU) 6 for displaying information to a user. The VDU 6 may display information in graphical format or any other format depending upon the programme instructions being processed by processor 2.

The user interface 5 also includes user input means 7 which in this example include a keyboard 8 (which in this example may be a standard QWERTY keyboard) and a mouse 9. The mouse 9 may be used to manipulate a graphical user interface (GUI) if a GUI is provided by software running on the computer. A network connection 10 is also provided for connecting to a network which may include a communication network (for example the internet) and other computers/computing systems.

The computing system of FIG. 1 may be implemented by any known type of computing hardware such as, for example, a PC, by a number of networked PCs if required to implement a system of this embodiment, by a "mainframe architecture" including a remote computer and user workstations connected to the remote computer, by a client-server architecture, including a client computer accessing a server computer over a network, or by any other computing architecture. This embodiment of the present invention is implemented by appropriate software providing instructions for operation of the computing system hardware to implement the system of the embodiment and implement the method of the embodiment.

The computing system need not be connected to a network if this is not required by the software or computer architecture.

Figure 4:
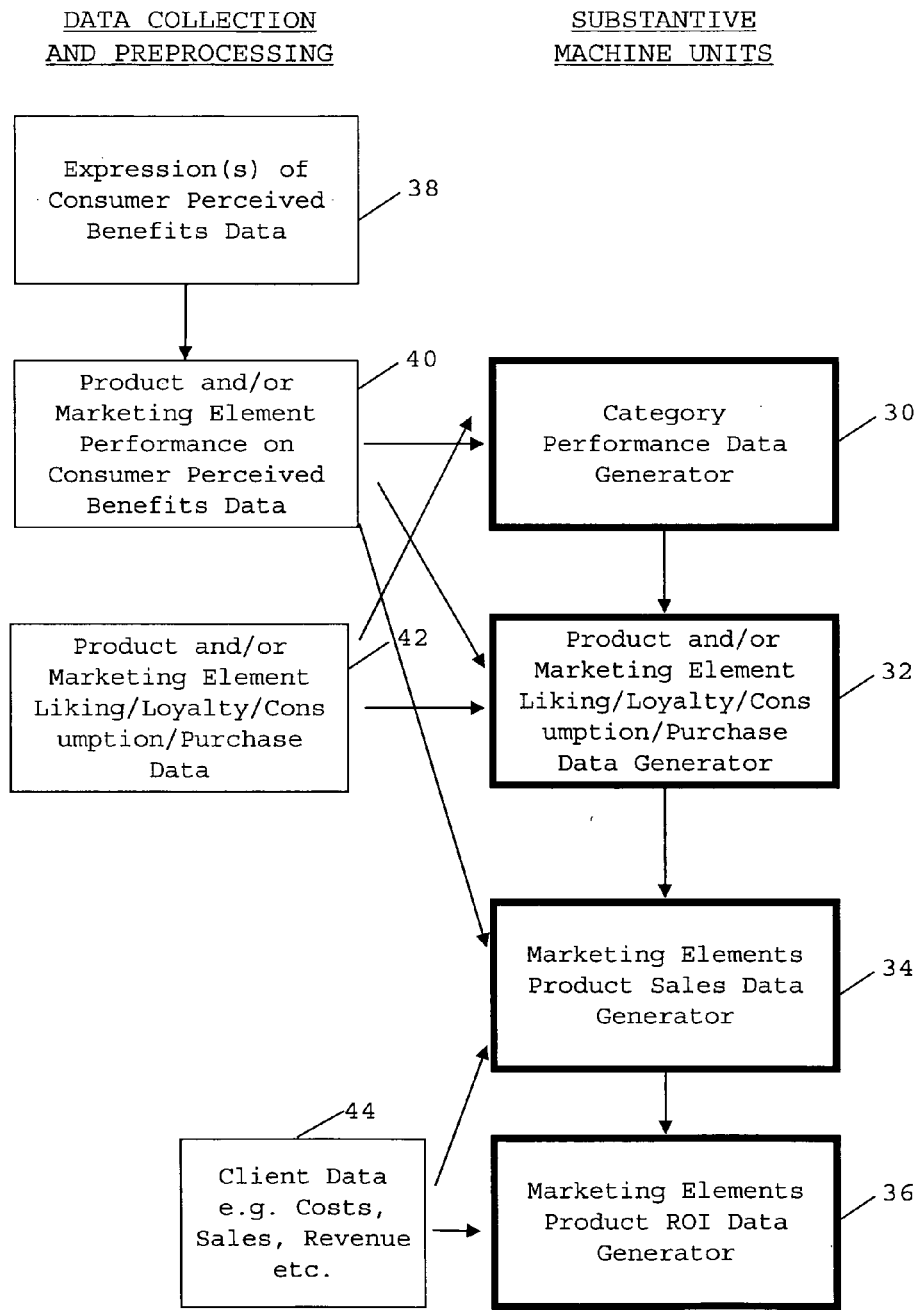
FIG. 4 is a block diagram showing units of the machine of FIG. 1 and the flow of information between the units.

FIG. 4 is a schematic diagram showing the is functional units of the machine 1. These functional units are implements as computer processes. Each of the substantive units 30, 32, 34 and 36, and information gathering and preprocessing units 38-44 may comprise hardware and/or software components in communication with each other. The substantive algorithms are performed in the category performance data generator 30, the product and/or marketing element liking/loyalty/consumption/purchase data generator 32, the marketing elements product sales data generator 34 and the marketing elements product Return on Investment (ROI) data generator 36. The algorithms associated with each of the units, the data collection and preprocessing units are described in more detail below.

At least part of the input data may be generated by collecting unbranded representations, or expressions, of consumer perceived benefits, which are the link between products' and/or marketing elements' unconscious consumer persuasion and consumers' liking/loyalty/consumption/purchase of the product and/or marketing element in question. Collection of the data may be achieved through a survey, such as an online survey, the results of which may be automatically compiled in a database stored on the machine 1 in preparation for the calculations. This is done by the unit labelled 38 in FIG. 4. In this embodiment, the machine is configured as a server connected to the internet. Consumer perceived benefits may be the (often unconscious) reason why people buy into a category and then choose a particular product within it. They may be the consumer's personal motivation for liking and/or loyalty and/or purchase and/or consumption of the category and then the particular product and/or marketing element in question. An example of consumer perceived or category benefits in different categories are listed in Table 1 below.

TABLE 1

Consumer perceived (category) benefit examples.

| Vodka Category Benefit As Perceived By Vodka Consumers | The Reasons Why People Buy Vodka & A Specific Vodka Product |
| --- | --- |
| Transformation (TR) | The need for mood change (i.e. relaxation or energization) that a drink of Vodka induces. |
| Socialisation (SO) | The need for connection with other people that is common to Vodka drinking occasions. |
| Identity (ID) | The need for the Vodka product in question to carry an image consistent with the consumer's personal taste and values (i.e. their personal identity). |
| Sensory Experience (SE) | The need for the Vodka product in question to be of good taste, smell, texture etc. |
| Credentials (CR) | The need for the Vodka product in question to be of good quality. |
| Banking Category Benefit As Perceived By Banking Consumers | The Reasons Why People Consume Banking Services & A Specific Banking Services Product |
| Security | The need for the banking services provider to be secure in the long-term safekeeping of consumer finances. |
| Suitable Products | The need for the banking services provider to provide a broad enough range of products to meet the varying needs of its consumers. |
| Low/High Interest Rates & Fees | The need for the banking services provider to have low/high interest rates and fees. |
| Customer Service | The need for the banking services provider to provide efficient and helpful customer service. |
| Contact Points | The need for the banking services provider to provide a suitable number of contact points for its consumers, so that they can access their finances and/or contact banking personnel easily. |
| Instant Coffee Category Benefits As Perceived By Instant Coffee Consumers | The Reasons Why People Buy Instant Coffee & A Specific Instant Coffee Product |
| Stimulation | The need for uplift that a drink of Instant Coffee induces. |
| Sensory Experience | The need for the Instant Coffee product in question to be of good taste, smell, texture etc. |
| Togetherness | The need for connection with other people that is common to Instant Coffee drinking occasions. |
| Credentials | The need for the Instant Coffee product in question to be of good quality. |
| Health | The need for the Instant Coffee product in question to either have health benefits or be relatively less unhealthy. |

During the survey unbranded expressions or representations of these benefits are presented to the consumer in a way that they relate to within the category context. For example, FIG. 2 may be a portion of what is displayed to a participant at a point in the online survey. The participant is prompted to select the visual representation of the many presented that best represents the transformative experience the participant seeks through consumption of Vodka. For example: "These cards represent different moods & feelings that might arise when drinking Vodka. Which of these do you relate to when drinking Vodka?"

Each consumer nominates his or her preferred expressions or representation(s) of the Vodka category benefit of Transformation.

The participant can select the best expression or representation for him or herself by clicking on it using a mouse, for example. Expressions or representations may not be only visual. They may be a sound, or any other representation that can be sensed by them.

The unconscious effect of marketing elements are compiled and may be pre-processed 2 in the processor in preparation for input into the substantive algorithm, implemented for example using a commercial statistical software package such as SPSS, SAS or R, or a custom programme.

In an alternative embodiment, the input data is obtained from a databases that continuously collects consumer data.

The types of questions that yield the data are disclosed below. The non-limiting examples are from a USA Vodka category case study across 826 consumers, conducted in January 2010. Throughout the rest of this specification, this case study will be referred to as the working example. The study's aim was to provide return on investment results for Vodka Product A and its marketing elements M, N, O, P, Q, R and S.

Figure 2:
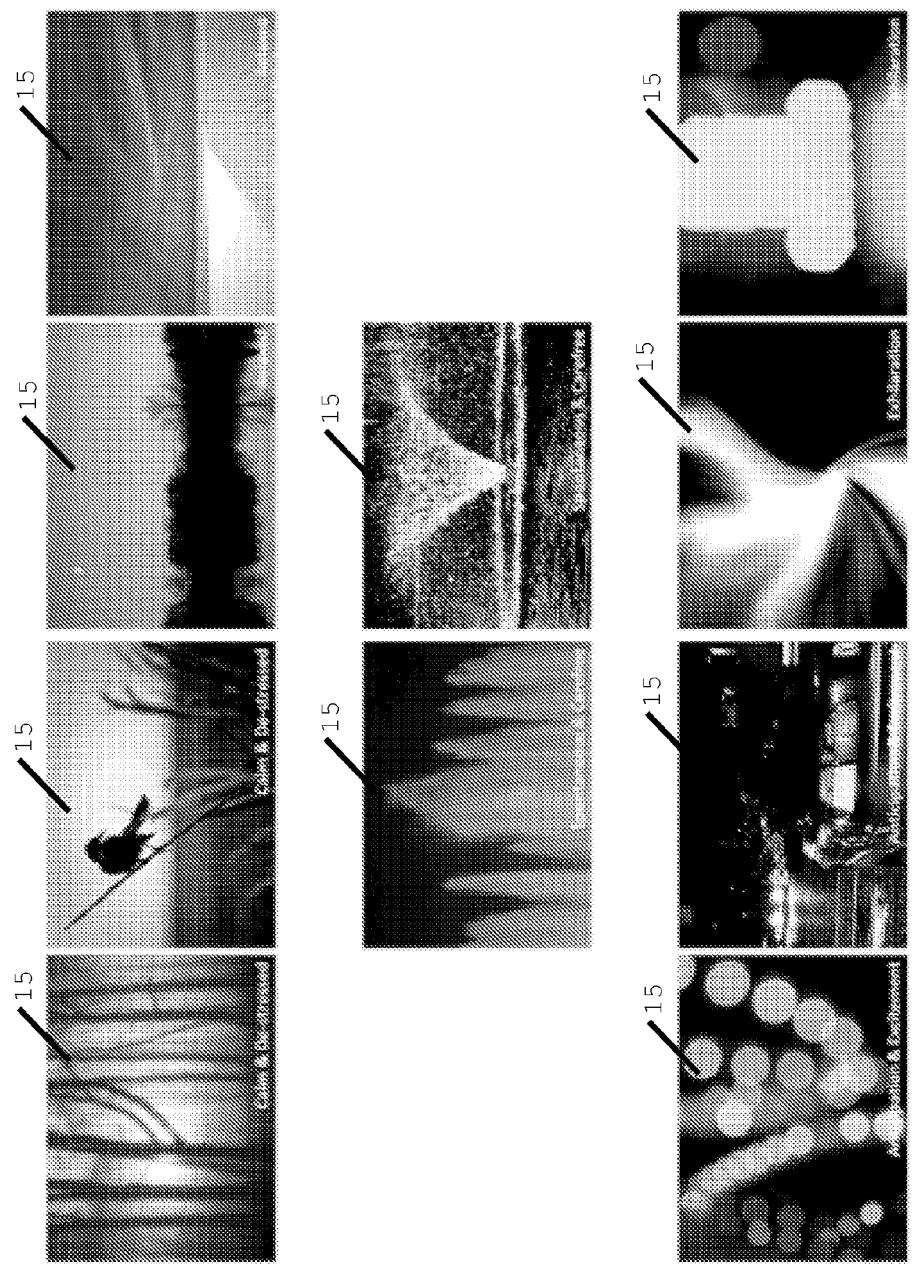
FIGS. 2 and 3 each show a part of respective images displayed by a machine similar to that shown in FIG. 1 to a survey participant.

The specific Vodka consumer perceived benefit expressions 15 shown in FIG. 2 are described as 'Transformation', though the word 'Transformation' is not shown to the consumer completing the survey. The data collection process may not ask consumers to link their responses to products and/or marketing elements with their liking/loyalty/consumption/purchase of a product and/or marketing element—this analysis may instead be performed by the algorithm. The participant selects expressions or representations from each of the one or more CPBs.

These unbranded representations of the consumer perceived benefit(s) could take different forms. Non-limiting examples include abstract pictures, literal pictures, text, audio stimulus, moving footage audio-visual stimulus, smells, tastes and textures. They are typically discovered as part of another process.

Each consumer repeats this procedure for all relevant consumer perceived benefits.

At the end of this process, consumers have selected or nominated their preferred expressions or representations of all the category or consumer perceived benefits presented to them. This means that they have provided a detailed, non-literal and hence unconscious, description of what they ideally want from the category in question (without reference to a particular product within it).

From the survey collected data, it is possible to measure multiple products and marketing elements against this ideal, by rating each product and/or marketing element on how well it represents one or more expressions of the consumer perceived benefits.

The example below shows how this was done for Vodka products and marketing elements, which included the brands themselves, advertising (on television, the internet, press and outdoor) and promotions, in the USA Vodka category survey (case study).

Figure 3:
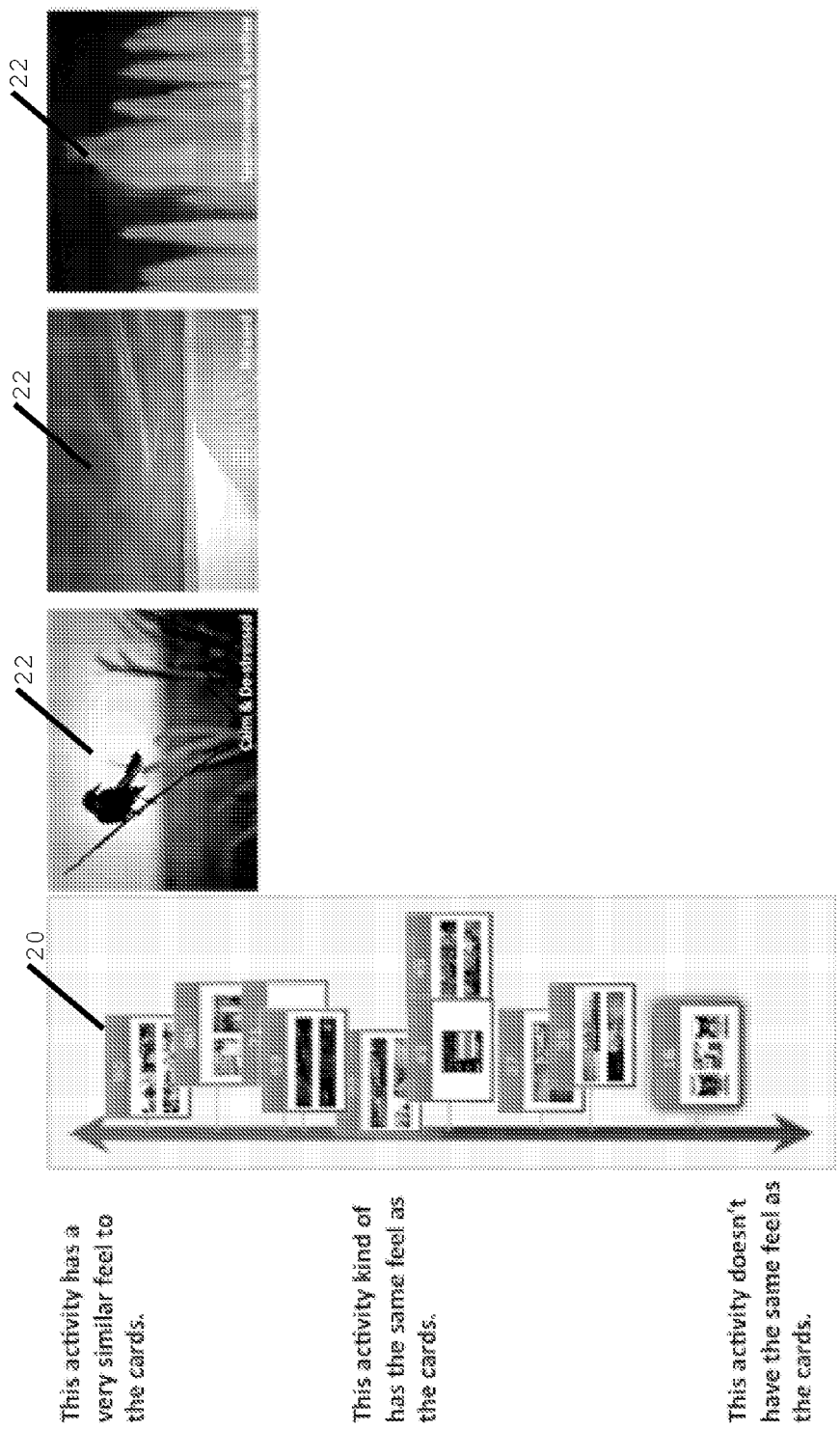

An image including what is shown in FIG. 3 is displayed on the VDU 6 to the participants with the prompt: "How well do these activities relate to these cards that you selected as representing moods & feelings that tend to arise when you drink Vodka?" This allows the participant to apply ratings.

The small rectangles such as 20 against the vehicle line scale shown on the left hand side in FIG. 3 are expressions or representations of the plurality of marketing elements (that consumers were exposed to and correctly branded). In this non-limiting example, in an online environment, each consumer placed each element 20 adjacent the line scale according to how well versus how poorly the element fit the stimulus 15 they previously nominated as their preferred representation 22 of the category benefit (in this case Transformation). They then repeated this process for all the category benefits across the plurality of Vodka marketing elements that they were exposed to and correctly branded.

They then repeated this process for the plurality of products within the case study that they were reasonably familiar with, i.e. that they had consumed within the last 6 months. (Note: a 'reasonably recent' time frame may be decided upon as is appropriate to the product or service category in question, as may the degree of familiarity with the product. This is collected by the unit labeled 40 in FIG. 4. In some categories, familiarity may necessitate consumption, though for a category like banking services, where cross-product consumption may be low, being aware of the product in question may be enough).

In this way, consumers' unconscious responses to Vodka marketing elements and products may be captured through the consumer perceived benefits.

Other relevant questions from the survey and any specifically commissioned or on-going consumer-based survey that uses the process explained in this specification, may yield the following data:

Each consumer's exposure (versus non-exposure) to a marketing element.

Each consumer's ability to correctly (versus not correctly) identify the brand the element was for.

The amount of each product that is purchased and/or consumed in a given period, e.g. 1 month, 3 months or 6 months, as is appropriate to that product or service category and/or the degree of liking and/or loyalty of each consumer towards each product and/or marketing element.

The data is collected by the units labeled 40 and 42 in FIG. 4.

The client or product owner who has commissioned the survey also provides the following information from their database(s)

The investment (e.g. production and media costs) of each individual marketing element for their product in question.

The total value of sales of their product in question in the chosen time period of analysis.

The product's cost of goods sold, margins and profits.

The selected marketing elements for review.

Their preferred time period of analysis, e.g. 12 months, 18 months etc.

The data is collected by the unit labeled 44 in FIG. 4.

Algorithms

This section discusses the algorithms implemented by the units of a machine such as the machine 1 that performs statistical calculations using the input data collected as described.

Importance of the Consumer Perceived Benefits

An algorithm performed by the Category Performance Data Generator 30 determines the importance of each of the consumer perceived benefits in driving liking/loyalty/consumption/purchase using the statistical technique of regression. The input variables to the regression analysis include:

As the independent variables, the products' and/or marketing elements' performance on the consumer perceived benefits; and As the dependent variables, the respective liking/loyalty/consumption/purchase levels of each of the multiple products and/or marketing elements.

Consumers, in completing the on line survey, have provided a representation of what they ideally want from the product or service category in question via their personally preferred representations of the category or consumer perceived benefits.

A survey per se does not provide the relative importance of each of the category benefits because this is largely unconscious. To illustrate this, if a consumer was asked how much Transformation they want from a Vodka product versus Socialization, they would not know how to answer this question. Asking the question consciously or even semi-consciously may not be viable in any product or service category, however this information can be derived from the data already collected.

The relative importance information is derived from the plurality of products and/or marketing elements' performance to consumer perceived benefits equation, using, for example, the following input variables:

Independent variables X—Individual consumer data of the plurality of products' and/or marketing elements' performance on the relevant consumer perceived benefits and Dependent variables Y—A function of individual consumer levels of liking/loyalty/consumption/purchase of each of the products and/or marketing elements. Examples of such variables could be sales (the actual quantity purchased and/or consumed of each of the products, which can be measured in either dollars or units purchased and/or consumed) or sales share (the actual quantity purchased and/or consumed of each of the products divided by the total quantity purchased and/or consumed of all products in the study) or consumers' degree of liking and/or loyalty towards each of the products and/or marketing elements, which is the degree of liking and/or affinity they each hold towards each products and/or marketing elements.

Using a computer programmed with statistical software (such as SPSS, SAS or R) and the statistical technique of regression to determine the strongest relationship between the independent and dependent variables, the equation is structured as below:

$$Y=\alpha+\beta(X).$$

The statistical technique of regression works by measuring the variance in X (either increase or decrease) that correlates with the variance (increase or decrease) in Y. So if Y is increasing or decreasing and X is increasing or decreasing along with it, it can be inferred that X explains Y to the extent of X's regression coefficient. This can either be a positive or negative correlation.

In the presented Vodka category working example, as this is a product category and the product is a tangible item comprising volume, volume is often used as a measure of sales in product categories. The regression equation input variables are therefore:

Y=Volume share of the plurality of Vodka products, which varies from 0-1 but can also be expressed as a percentage 0-100%. Volume share has in this instance been chosen as the Y variable instead of actual volume because volume share is a measure of each individual consumer's purchase/consumption level of the product, relative to other Vodka products, irrespective of how much Vodka they drink. This is a better measure of the purchase/consumption 'performance' of the product versus other products as it removes the bias of how much Vodka each consumer drinks.

X=The performance of the plurality of Vodka products against the consumer perceived benefits (Transformation, Socialization, Identity, Sensory Experience & Credentials). Scores on these consumer perceived benefits in this example, vary from 0-100, though different line scales can be used.

Using data collected from the USA Vodka consumer survey across 826 consumers input to a computer programmed with statistical software, the equation is:

$$\text{Volume share}=0+0.000819TR+0.000954SO+0.0007581D+0.000561SE+0.000165CR.$$

TABLE 2

Coefficients and importance of each of the consumer perceived benefits across Product A's total consumer base.

| Consumer Perceived Benefit | Regression Coefficient (Consumer Perceived Benefit Relative Importance) | Regression Coefficient % (Importance) |
|---|---|---|
| Transformation | 0.000819 | 25% |
| Socialization | 0.000954 | 30% |
| Identity | 0.000758 | 23% |
| Sensory Experience | 0.000561 | 17% |
| Credentials | 0.000165 | 5% |
| Total | 0.003257 | 100% |

All calculations in the Vodka case study working example were done via machine and rounded up to the decimal places shown.

The consumer perceived benefit with the highest coefficient is that which varies in conjunction with volume share the most. This regression analysis has determined that an increase in Y (volume share) correlates the most with an increase in Socialization. Specifically, an increase of 1 in Socialization correlates with a 0.000954 increase in volume share. This suggests that Socialization is the most important consumer perceived benefit in the USA Vodka category for this sample of consumers, followed by Transformation, then Identity etc.

When these coefficients are converted to percentages (by dividing the regression coefficient by the total, e.g. for Socialization=0.000954/0.003257=30%), this is made especially clear as this conversion indicated that Socialization contributes 30% to volume share in the USA Vodka category in comparison to the other consumer perceived benefits that contribute less.

Measuring the importance for each of the one or more consumer perceived benefits may be highly advantageous. Once determined, it is possible to compare the benefits of the product extolled by any one marketing element and the importance of each of those benefits as perceived by a consumer. Consequently, it is possible to use the measure of importance to determine if the extolled benefits are indeed the important ones, or to craft a product and/or marketing element that extols benefits that are perceived as important to the consumer and thus effective.

While all consumers may be lumped together, typically each individual has different preferences. Focusing on a particular individual can help inform those marketing to that particular person, however because statistical calculations require numerous data points, it is not possible to calculate this equation at the individual consumer level. Hence, small groups of similar consumers have been bundled together.

The following Table 3 shows the results of the above calculations done across each of the smaller consumer groups in the working example USA Vodka category study. Consumers were grouped according to appropriate similarity as per the Vodka category. In this non-limiting example, groups comprised similarity across purchase/and or consumption product preferences and demographics.

The information in Table 3 contains what each consumer, as represented by their associated group, ideally wants from the Vodka category in terms of the relative importance of each of the consumer perceived benefits in driving Vodka purchase and/or consumption. The individual representation of each of those benefits has already been collected via the online consumer survey across 826 Vodka consumers in the USA.

TABLE 3

Example consumer perceived benefit importance for the selected groups of similarity in Product A's consumer base.

| | Group 1 % | 2 % | 3 % | 4 % | 5 % | 6 % | 7 % | 8 % | 9 % | 10 % | 11 % |
|---|---|---|---|---|---|---|---|---|---|---|---|
| TR | 20 | 34 | 7 | 45 | 1 | 13 | 16 | 28 | 0 | 37 | 4 |
| SO | 37 | 9 | 13 | 21 | 38 | 55 | 12 | 41 | 55 | 47 | 26 |
| ID | 28 | 28 | 2 | 16 | 22 | 0 | 16 | 7 | 23 | 1 | 1 |
| SE | 0 | 29 | 50 | 18 | 23 | 15 | 4 | 0 | 22 | 5 | 51 |
| CR | 15 | 0 | 28 | 0 | 16 | 17 | 52 | 24 | 0 | 10 | 18 |
| Total | 100 | 100 | 100 | 100 | 100 | 100 | 100 | 100 | 100 | 100 | 100 |

This information is input to the step described below.

Determining how Elements Drive Product and/or Marketing Elements Liking/Loyalty/Consumption/Purchase Using a Product and/or Marketing Element Liking/Loyalty/Consumption/Purchase Data Generator 32 programmed with statistical software defining an algorithm, the product and/or marketing element in question's performance to consumer perceived benefits equation is derived by:

A regression analysis between the product and/or marketing element in question's liking/loyalty/consumption/purchase; and Its weighted performance against the consumer perceived benefits.

Weighted data includes, for example:

The importance of each of the consumer perceived benefits (as per Table 3) multiplied by The performance of the product and/or marketing element in question on the consumer perceived benefits.

The Vodka online survey and subsequent analysis has collected then derived what each consumer wants from the Vodka category, as well as collected the performance of the plurality of Vodka products and marketing elements against that ideal.

To arrive at algorithms that accurately convert the Vodka product in question, Product A's, marketing elements into financial return on investment, the focus must now shift to how Product A has specifically driven its purchase and/or consumption, i.e. volume, to date. Ultimately this will be via the Product A performance to consumer perceived benefits equation. Using that equation, each element's contribution to Product A's volume can be measured. After that, return on investment for each element can be calculated.

One way to generate this equation may be thought to repeat the process above but only across Product A performance on the consumer perceived benefits and Product A purchase and/or consumption, to regress:

Independent variables X—Product A performance data on the relevant consumer perceived benefits with Dependent variable Y—Product A levels of purchase and/or consumption.

However, this is incorrect. In the previous analysis, the relative performance of the products included in the working example n=826 consumer survey on the consumer perceived benefits was regressed against the relative volume share of the products. In the Product A-specific analysis, this relativity is lost, meaning that the performance of Product A on each of the consumer perceived benefits is over-estimated as a driver of Product A's volume share.

To illustrate this, Table 4 below shows that Group 2 has an above average (higher than the total sample) Product A volume share (0.59 versus 0.39), which means that Group 2 consumes an above average amount of Product A versus other Vodka products as a percentage of their total Vodka consumption. A Product A-data only regression analysis would indicate that this is mainly driven by Socialization because its high performance score (90) correlates with this group's higher volume share (0.59). However, this is not true because the importance of Socialization to this group is low (at only 9%). For Group 9, who show a lower than average volume share (0.19 versus 0.39) for Product A, a Product A-data only regression analysis would indicate that this is driven by Credentials (76), which shows the lowest performance across all the consumer perceived benefits for this group. However, Credentials is of no importance to this group at all (0%), making it non-influential as a reason why this group of consumers show low Product A volume share.

TABLE 4

Example of Product A volume share, importance and Product A performance against each consumer perceived benefit across Group 2 and Group 9 from the total consumer sample.

| Product A | | TR | | SO | | ID | | SE | | CR |
| --- | --- | --- | --- | --- | --- | --- | --- | --- | --- | --- |
| Volume share | Imp. % | Perf. | Imp. % | Perf. | Imp. % | Perf. | Imp. % | Perf. | Imp. % | Perf. |
| Group 2 | 0.59 | 34 | 88 | 9 | 90 | 28 | 86 | 29 | 86 | 0 | 83 |
| Group 9 | 0.19 | 0 | 77 | 55 | 76 | 23 | 78 | 22 | 78 | 0 | 76 |
| Total | 0.39 | 25 | 81 | 30 | 83 | 23 | 83 | 17 | 82 | 5 | 80 |

There is a need to derive a Product A performance to consumer perceived benefits equation, in order to determine the level of influence of each of the consumer perceived benefits in driving Product A's volume share, in order to convert Product A marketing elements into return on investment. The way to overcome the issue of how to derive this equation is to use Product A weighted data; that weighted data comprising Product A's performance on, multiplied by the importance of, each consumer perceived benefit across each consumer, as input to the regression analysis to volume share. Data for 2 consumers are shown in Table 5 below and calculations follow. (Please note, the importance data was taken from Table 3).

TABLE 5

Example of Product A volume share, importance and Product A performance data against each of the consumer perceived benefits for two consumers.

| Product A | | TR | | SO | | ID | | SE | | CR |
| --- | --- | --- | --- | --- | --- | --- | --- | --- | --- | --- |
| Volume share | Imp. % | Perf. | Imp. % | Perf. | Imp. % | Perf. | Imp. % | Perf. | Imp. % | Perf. |
| Consumer 1 (Group 2) | 0.82 | 34 | 83 | 9 | 72 | 28 | 91 | 29 | 84 | 0 | 58 |
| Consumer 2 (Group 9) | 0.10 | 0 | 81 | 55 | 35 | 23 | 62 | 22 | 81 | 0 | 50 |

Across the 826 consumers in the USA Vodka case study and working example, each consumer's weighted data is:

Weighted TR=Importance TR %*Performance TR (as per Table 5)
Weighted SO=Importance SO %*Performance SO
Weighted ID=Importance ID %*Performance ID
Weighted SE=Importance SE %*Performance SE
Weighted CR=Importance CR %*Performance CR.

For consumer 1 (in Group 2), the calculations are:
Weighted TR=34%*83=28
Weighted SO=9%*72=6
Weighted ID=28%*91=25
Weighted SE=29%*84=25
Weighted CR=0%*58=0.

The weighted data for Consumers 1 (Group 2) and 2 (Group 9) are shown in Table 6 below.

TABLE 6

Example Product A volume share and Product A weighted data for 2 consumers.

| | Volume Share | TR | SO | ID | SE | CR |
|---|---|---|---|---|---|---|
| Consumer 1 | 0.82 | 28 | 6 | 25 | 25 | 0 |
| Consumer 2 | 0.10 | 0 | 19 | 14 | 18 | 0 |

This weighted data was calculated across all consumers in the sample (n=826).

Once the weighted data has been calculated, the Product A performance to consumer perceived benefits equation can be derived by the equation $Y=\alpha+\beta(X)$, where
Y=Product A's volume share (a function of levels of purchase and/or consumption of Product A).
X=Product A's weighted performance on the consumer perceived benefits.

Using Product A volume share and weighted consumer perceived benefits data across the 826 consumers input to a computer programmed with statistical software, the equation is:

Product A volume share=0+0.00460TR+0.00594SO+ 0.00518ID+0.00403SE+0.00181CR.

The output from the statistical software package indicates that Product A volume share is 75.3% explained by Product A's weighted performance on the consumer perceived benefits. What this means is that future Product A volume share is 75.3% likely to be predicted by this equation. In most data sets, statisticians are very happy to get equation explanation scores of around 50%, so this equation is very strong.

The consumer perceived benefits as influencers of Product A volume to date can therefore be expressed as per Table 7 below.

TABLE 7

The influence of each of the consumer perceived benefits on Product A volume share.

| Product A Consumer Perceived Benefit | Product A Regression Coefficient (Consumer Perceived Benefit Relative Influence) | Product A Regression Coefficient % (Influence) |
|---|---|---|
| Transformation | 0.00460 | 21% |
| Socialization | 0.00594 | 28% |
| Identity | 0.00518 | 24% |
| Sensory Experience | 0.00403 | 19% |
| Credentials | 0.00181 | 8% |
| Total | 0.02157 | 100% |

Table 7 suggests that an increase of 1 in Socialization correlates with a 0.00594 increase in volume share. This means that Socialization influences Product A volume share 28% in comparison to the other consumer perceived benefits that influence Product A volume share less, (Identity 24%, Transformation 21% etc).

This equation is a representation of how Product A has built its volume share to date (by delivering on the consumer perceived benefits to the extent of the percentage contribution or influence of the benefit as per Table 7).

Such an equation in any product or service category is the means by which consumers' individual scoring of a product's marketing elements on the consumer perceived benefits, is converted to financial return on investment, as per the processes explained subsequently.

Marketing Elements Product Sales Data Generator

The marketing elements product sales data generator 34 measures each element's sales contribution to the product in question's total sales in the product owner's predetermined time period. There are multiple steps here:

I. Derive a measure of how much the combined marketing elements under review contributed to the product's overall performance on each of the consumer perceived benefits. This is a measure of the effectiveness of the combined marketing elements but is in the mathematical language of the consumer perceived benefits. It will need to be converted into the mathematical language of sales.

a. Firstly, subtract the product in question's performance scores against each of the consumer perceived benefits across the people who have NOT been exposed to or correctly branded any of the product in question's marketing elements, from the product's performance scores against each of the consumer perceived benefits across the people who have been exposed to and correctly branded at least 1 of the product's marketing elements under review.

b. This figure is then divided by the product's performance scores against each of the consumer perceived benefits across the Total Sample, to determine the required measure of how much the combined marketing elements under review contributed to the product's overall performance on each of the consumer perceived benefits.

II. In order to determine the marketing elements combined sales contribution, the product's performance to consumer perceived benefits equation is used:

a. Firstly, because the result from step I above is in the language of consumer perceived benefits and not in the language of the equation that uses the product's performance on the consumer perceived benefits weighted data, a weighting step needs to be inserted. This weighting step simply involves multiplying the measure obtained in Ib by the product's weighted performance on the consumer perceived benefits.

b. The results from step IIa can then be inserted into the product's performance to consumer perceived benefits equation, to determine the overall sales generated by the combined product in question's marketing elements under review, across people who have been exposed to and correctly branded at least 1 of the product in question's marketing elements.

c. The results from step IIb can then be converted to the overall sales generated by the combined product in question's marketing elements under review across the total consumer sample, by multiplying that result by the percentage of people who have been exposed to and correctly branded at least 1 of the product's marketing elements under review. This result is the percentage of the product in question's total sales, in the chosen time period, generated by all the product's marketing elements under review across the total sample.

III. It is now necessary to determine how much each element contributed to the product's total sales in the chosen time period. This involves:
  a. Across those who were exposed to and correctly branded each element, obtain the raw scores for each element for
    i. Each consumer perceived benefit
    ii. Branding and
    iii. Exposure.
  b. Then input the element in question's performance on each of the consumer perceived benefits, into the product in question's performance to consumer perceived benefits equation. This is done by multiplying the element's raw performance score on each of the consumer perceived benefits by the consumer perceived benefit's percentage coefficient in the performance to consumer perceived benefits equation, then adding the interim consumer perceived benefit scores to arrive at a Consumer Perceived Benefit Total score. This is effectively one measure of the element's creative performance (the other is its Branding score).
  c. To incorporate the other creative and media variables into the analysis, that element in question's Branding*Exposure is calculated. This results in a Branded Exposure figure.
  d. In the final analysis, it is necessary to combine all the elements in question's performance variables together (both creative and media performance variables). This is achieved by simply multiplying the element's Consumer Perceived Benefit Total by its Branded Exposure. This final figure is the element in question's total performance score relative to the other marketing elements under review, however it is not yet a contribution to the product in question's total sales amount.
  e. In order to determine how much the element in question contributed to the product in question's total sales, the above process IIIa-d is repeated for each element. Each element's total performance score relative to the other marketing elements under review (as per step IIId) are added up to a total performance score across all the product in question's marketing elements under review.
  f. To convert this to a percentage contribution of the element in question, that element's total performance score relative to the other elements under review is divided by the total performance score of all the product in question's marketing elements under review (the result of step IIIe).
  g. Finally, to convert this to a percentage contribution of the element in question to the product in question's total sales, the result of step IIIf is multiplied by the result of step IIc, (which was the percentage of the product in question's total sales, in the chosen time period, generated by all the product's marketing elements under review). This final figure is the percentage contribution of the element in question to the product in question's total sales.

The Vodka category working example will continue to illustrate the above process. The explanation of Inputs is followed by an explanation of the Calculations using the steps as per above.

Marketing Elements Product Sales Data Generator Inputs

Referring again the USA Vodka category working example across 826 Vodka consumers, Table 8 below shows Product A's non-weighted performance against the consumer perceived benefits across:

The Total Sample

People who have been exposed to and correctly branded 1 or more of the Product A elements under review (ECB)

People who have not been exposed to or correctly branded any Product A elements under review (Non-ECB).

TABLE 8

Example non-weighted performance for Product A against the consumer perceived benefits.

| Product A | Total Sample | Exposed Correctly Branded (ECB) | Not Exposed Or Correctly Branded (Non-ECB) |
| --- | --- | --- | --- |
| Transformation | 81.00 | 82.26 | 77.86 |
| Socialization | 82.91 | 83.43 | 81.63 |
| Identity | 82.58 | 83.31 | 80.78 |
| Sensory Experience | 82.28 | 83.15 | 80.14 |
| Credentials | 80.03 | 80.55 | 78.72 |
| No. Of People | 826 | 589 | 237 |

Table 9 below shows Product A's weighted performance on the consumer perceived benefits and Product A's total volume share across the total sample of 826 consumers. This is the result of weighted scores calculated for each of the n=826 Vodka case study working example consumers as per Table 6. The average of these scores against each consumer perceived benefit across the total sample is Product A's weighted performance against the consumer perceived benefit as per Table 9 below.

TABLE 9

Example Product A volume share and Product A weighted performance against the consumer perceived benefits.

Benefit

| | Product A's Weighted Performance Across The Total Sample |
| --- | --- |
| Transformation | 18.16 |
| Socialization | 23.01 |
| Identity | 17.57 |
| Sensory Experience | 15.11 |
| Credentials | 8.38 |
| | Product A's Total Volume Share Across The Total Sample |
| Volume Share | 0.39 |

Table 10 below shows the non-weighted performance of Product A element S on each of the consumer perceived benefits across the people who were exposed to and correctly branded element S. It also shows the percentage of people who were exposed to Product A element S as well as the percentage of those people exposed who correctly identified the brand the marketing element was aimed at.

TABLE 10

Example Product A Element S performance against the consumer perceived benefits, branding & exposure.

| Benefit | Product A Element S Performance |
|---|---|
| Transformation | 73 |
| Socialization | 61 |
| Identity | 71 |
| Sensory Experience | 81 |
| Credentials | 72 |
| Branding % | 90 |
| Exposure % | 48 |

Marketing Elements Product Sales Data Generator Calculations

The marketing elements product sales generator 34 measures each element's sales contribution to the product in question's total sales in the product owner's pre-determined time period. There are multiple steps here:

I. Derive a measure of how much the combined elements under review contributed to the product's overall performance on each of the consumer perceived benefits. This is a measure of the effectiveness of the combined elements but is in the mathematical language of the consumer perceived benefits. It will need to be converted into the mathematical language of sales.

a. Firstly, subtract the product in question's performance scores against each of the consumer perceived benefits across the people who have NOT been exposed to or correctly branded any of the product in question's marketing elements, from the product's performance scores against each of the consumer perceived benefits across the people who have been exposed to and correctly branded at least 1 of the product's elements under review.

Using data from Table 8, the calculations for Transformation are:

82.26 (*ECB*)−77.86 (Non-*ECB*)=4.4.

The results for each of the consumer perceived benefits are shown in Table 11 below.

TABLE 11

Example Product A scores.

| Benefit | Product A Scores Across Consumer Perceived Benefits: ECB-Non-ECB |
|---|---|
| Transformation | 4.40 |
| Socialization | 1.80 |
| Identity | 2.53 |
| Sensory Experience | 3.01 |
| Credentials | 1.83 | b. This figure is then divided by the product's performance scores against each of the consumer perceived benefits across the Total Sample, to determine the required measure of how much the combined elements under review contributed to the product's overall performance on each of the consumer perceived benefits.

Using data from step 1*a* (Table 11 above) and data from Table 8, the calculations for Transformation are:

4.40/81 (Total Sample score on Transformation)= 5.4%.

The results for each of the consumer perceived benefits are shown in Table 12 below.

TABLE 12

Example Product A elements combined contributions to performance.

| Benefit | How Much The Combined Elements Under Review Contributed To Product A's Overall Performance On Each Of The Consumer Perceived Benefits % |
|---|---|
| Transformation | 5.4 |
| Socialization | 2.2 |
| Identity | 3.1 |
| Sensory Experience | 3.6 |
| Credentials | 2.3 |

II. In order to determine the elements' combined sales contribution, the product's performance to consumer perceived benefits equation is used:

a. Firstly, because the result from step I above is in the language of consumer perceived benefits and not in the language of the equation that uses the product's performance on the consumer perceived benefits weighted data, a weighting step needs to be inserted. This weighting step simply involves multiplying the measure obtained in Ib by the product's weighted performance on the consumer perceived benefits.

Using data from step 1*b* (Table 12 above) and data from Table 9, the calculations for Transformation are:

5.4%*18.16 (Product *A*'s weighted Transformation performance score)=0.99.

The results for each of the consumer perceived benefits are shown in Table 13 below.

TABLE 13

Example Product A elements combined contributions to weighted performance.

| Benefit | How Much The Combined Elements Under Review Contributed To Product A's Overall Performance On Each Of The Consumer Perceived Benefits % * Product A's Weighted Performance |
|---|---|
| Transformation | 0.99 |
| Socialization | 0.50 |
| Identity | 0.54 |
| Sensory Experience | 0.55 |
| Credentials | 0.19 | b. The results from step IIa can then be inserted into the product's performance to consumer perceived benefits equation, to determine the overall sales generated by the combined product in question's elements under review, across people who have been exposed to and correctly branded at least 1 of the brand in question's marketing elements.

Using data from step IIa (Table 13 above) and Product A regression coefficients from Table 7, the calculations for Transformation are:

0.99*0.00460 (Product *A*'s Transformation regression coefficient)=0.0045.

The results for each of the consumer perceived benefits are shown in Table 14 below, along with the total volume share result generated by all Product A elements under review.

TABLE 14

Example volume share generated by all the
Product A elements under review.

| Benefit | Volume Share Generated By The Combined Product A Elements Under Review (Across Only Those Who Have Been Exposed To And Correctly Branded At Least 1 Product A Element) |
|---|---|
| Transformation | 0.0045 |
| Socialization | 0.0030 |
| Identity | 0.0028 |
| Sensory Experience | 0.0022 |
| Credentials | 0.0003 |
| Total Volume Share | 0.0129 |

To convert the results from the contribution of all Product A elements under review to Product A's total volume share to the contribution of all Product A elements under review to Product A's total actual volume, the following calculation is performed:

0.0129 (Product $A$'s total volume share generated by all Product $A$ elements under review (Table 14))/ 0.39 (Product $A$'s total volume share (Table 9))=3.33%.

This represents the contribution of all Product A elements under review to Product A's total volume in the chosen time period of analysis, across those who were exposed to and correctly branded at least 1 Product A elements under review.

Contribution to total actual volume (versus volume share) is required for the return on investment calculations, which are a function of the sales generated by the element under review and its costs. This is why this conversion is done.

c. The results from step IIb can then be converted to the overall sales generated by the combined product in question's elements under review across the total consumer sample, by multiplying that result by the percentage of people who have been exposed to and correctly branded at least 1 of the product's elements under review. This result is the percentage of the product in question's total sales, in the chosen time period, generated by all the product's elements under review across the total sample.

Using data from step IIb and data from table 8, the amount of Product A volume generated by all the combined Product A elements across the total sample is:

3.33%*71.3% (the 589 consumers exposed to and correctly branded at least 1 Product $A$ element under review/826 consumers in the study as per Table 8)=2.37%.

III. It is now necessary to determine how much each element contributed to the product's total sales in the chosen time period. This involves:
  a. Across those who were exposed to and correctly branded each element, obtain the raw scores for each element for
    i. Each consumer perceived benefit
    ii. Branding and
    iii. Exposure.
  b. Then input the element in question's performance on each of the consumer perceived benefits, into the product in question's performance to consumer perceived benefits equation. This is done by multiplying the element's raw performance score on each of the consumer perceived benefits by the consumer perceived benefit's percentage coefficient in the performance to consumer perceived benefits equation, then adding the interim consumer perceived benefit scores to arrive at a Consumer Perceived Benefit Total score. This is effectively one measure of the element's creative performance (the other is its Branding score).

Using Product A regression coefficient percentages from Table 7 and Product A Element S performance against the consumer perceived benefits as per Table 10, the calculations are:

21%*73 ($TR$)+28%*61 ($SO$)+24%*71 ($ID$)+ 19%*81 ($SE$)+8%*72=70.51.

This is the Consumer Perceived Benefit Total score for Product A Element S.
  c. To incorporate the other creative and media variables into the analysis, that element in question's Branding*Exposure is calculated. This results in a Branded Exposure figure.

Using data from Table 10, the calculations for Product A Element S Branded Exposure are:

90% (Branding)*48% (Exposure)=43%.

This is Product A Element S's Branded Exposure.
  d. In the final analysis, it is necessary to combine all the element in question's performance variables together (both creative and media performance variables). This is achieved by simply multiplying the element's Consumer Perceived Benefit Total by Branded Exposure. This final figure is the element in question's total performance score relative to the other elements under review, however it is not yet a contribution to the product in question's total sales amount.

Using data from steps IIIb & c, calculations for Product A Element S's total performance score, relative to the other elements under review, are:

70.51*43%=30.64.

This is a relative creative and media performance score for Product A Element S (versus the other elements under review).
  e. In order to determine how much the element in question contributed to the product in question's total sales, the above process IIIa-d is repeated for each element. Each element's total performance score relative to the other elements under review (as per step IIId) are added up to a total performance score across all the product in question's marketing elements under review.

The calculations for all Product A elements under review are not shown here, however the total creative and media performance score for all Product A elements under review is 125.79.
  f. To convert this to a percentage contribution of the element in question, that element's total performance score relative to the other elements under review is divided by the total performance score of all the product in question's marketing elements under review (the result of step IIIe).

Using data from steps IIId & e, the calculations are:

30.64/125.79=24.4%.

This is a percentage contribution score for Product A Element S to Product A elements' total performance.
  g. Finally, to convert this to a percentage contribution of the element in question to the product in question's total sales, the result of step IIIf is multiplied by the result of step IIc, (which was the percentage of the product in question's total sales, in the chosen time period, generated by all the product's elements under review). This final figure is the percentage contribution of the element in question to the product in question's total sales.

Using data from step IIIf and IIc, the calculations are:

24.4%*2.37%=0.58%.    5

This final figure is the percentage contribution of Product A Element S to Product A's total volume.

Marketing Elements Product Return on Investment Data Generator

Each element's financial return on investment is calculated in the following 2 steps, and may be performed by the marketing elements product return on investment (ROI) data generator 36:

1. Multiply the product in question's sales generated by the element by the total value of sales for the product in the chosen time period of analysis.
2. Divide the previous step's result by the total cost of the element, as provided by the client or product owner.

Referring again to the USA Vodka category example, the calculations for Product A Element S are:

0.58% (the percentage contribution of Element $S$ to Product $A$'s total volume)*$688,500,000 (Product $A$'s total value of sales)=$3,981,422    1.

$3,981,422/$1,239,300 (the combined production and media costs of Element $S$)=3.21    2.

This indicates that for every dollar invested in element S, Product A generated $3.21, which meant a gain of $2.21 per dollar spent.

An embodiment has the following characteristics:

It measures the effect of an individual marketing element on an individual consumer's unconscious then converts that effect into the financial return on investment of the element. It does this by mathematically linking the unconscious persuasion of the element to consumers' on-going liking/loyalty/consumption/purchase of the product, which can then be converted into a financial return on investment figure.

By capturing all of this information at the individual consumer and element levels, micro analyses at the individual element level and smaller consumer group levels can be performed, in addition to more macro analyses. Examples of more macro is analyses include the effect of combined elements in one media channel versus another, as well as the effect of combined elements in one campaign versus another, as well as the effect of elements on one group of consumers versus another or versus the total consumer sample.

This eliminates the issue of isolating the effect of marketing elements on sales, as this measurement is taken directly between the consumer, the element and their on-going liking/loyalty/consumption/purchase of the product.

It also eliminates the issue of providing only a short-term financial perspective as this analysis starts with the consumer's long-term perspective, then moves through to the short-term financial perspective, which means that both perspectives are provided.

The reasons behind performance, specifically the creative versus media effect of the element, are thoroughly provided. By capturing the element's performance on the consumer perceived benefits of the category in question, branding and exposure, such creative versus media reasons for performance come to light.

What follows demonstrates how the process delivers on the above statements.

Table 15 below shows the process's results for 5 USA Vodka Product A Elements—M, N, O, P & S.

TABLE 15

Example process results.

| Element | Performance On Consumer Perceived Benefits | | | | | | Branding & Exposure % | | Branded Exposure | Total Volume Contribution | Cost $USD | ROI |
|---|---|---|---|---|---|---|---|---|---|---|---|---|
| | TR | SO | ID | SE | CR | CPBTS | EX | BR | % | % | Millions | $ |
| M | 64 | 60 | 68 | 49 | 53 | 60.13 | 15 | 26 | 4 | 0.04 | 2.1 | 0.15 |
| N | 86 | 76 | 86 | 85 | 88 | 83.27 | 25 | 59 | 15 | 0.23 | 2.5 | 0.63 |
| O | 63 | 66 | 70 | 76 | 80 | 69.33 | 60 | 97 | 58 | 0.76 | 1.2 | 4.22 |
| P | 70 | 68 | 77 | 77 | 80 | 73.07 | 38 | 93 | 35 | 0.48 | 0.8 | 4.02 |
| S | 73 | 61 | 71 | 81 | 72 | 70.51 | 48 | 90 | 43 | 0.58 | 1.2 | 3.21 |

Elements M & N were television commercials.
Elements O, P & S were outdoor advertisements.

Table 15 shows that television was a less effective media channel than outdoor as it only drove 0.04%+0.23%=0.27% of Product A's volume versus outdoor, which drove 0.76%+0.48%+0.58%=1.82%. Both of the television commercials also generated negative financial return on investment scores versus the outdoor advertisements, all of which generated very strongly positive financial return on investment scores. The underperformance of television was largely driven by M's underperformance across all the variables.

Elements N and O were part of the same campaign, in that they delivered a similar message, direction and tone. The combined short-term financial return on investment of the campaign was $1.82 (((0.23%+0.76%)*$688,500,000)/($2,500,000+$1,200,000))=$1.82), a positive result, largely driven by the outdoor Element O and more specifically, its relatively low cost. From an overall performance perspective, N would have delivered more volume to Product A and a better financial return on investment if its Exposure and Branding were stronger (being 25% and 59% respectively).

However, N's Consumer Perceived Benefits Total Score (83.27), a measure of the longer-term effect of marketing element) indicates that it was actually the strongest performer of all the elements shown on this score. This means that it delivered the best against consumers' (largely unconscious) reasons for purchasing Vodka and in particular Product A. This is a significant insight into N's performance that its financial return on investment result alone, would not reveal.

In this way, the process provides real transparency as to the multi-faceted performance of a marketing element, including its shorter versus longer-term performance, its creative versus media performance as well as the performance of individual elements versus a group of elements in the same channel or campaign.

Finally, to illustrate how the process offers further transparency around the product's consumer base and what they ideally want from the category and product in question, an analysis of the reasons behind Element P versus Element S's performance ensues.

The consumer perceived benefits as drivers of Product A volume share were shown in Table 7 as the Product A regression coefficient percentages. Table 7 indicates that the consumer perceived benefits of Socialization and Identity are the most important drivers of Product A's volume share, in driving share 28% and 24% of it respectively.

Part of Table 15 is repeated below, indicating Element P's stronger performance on Socialization and Identity versus Element S, which performed better on Transformation and Sensory Experience, which are less important consumer perceived benefits to this consumer base. This is why Element P has a stronger Consumer Perceived Benefit Total Score (a measure of the longer-term effect of element; a measure of consumers' (largely unconscious) reasons for purchasing Vodka and in particular Product A).

invention may be used in earlier stages of a marketing development cycle as input to the development of a product and/or marketing element. For example, a product and/or marketing element, whether it be an existing or an initial design, may be measured against consumer perceived benefits. The measured scores of the consumer perceived benefits for the product and/or marketing element can then be compared with the consumer perceived benefits known to be important to a target consumer group. The product and/or marketing element can then be adjusted accordingly, typically to improve the match between of the consumer perceived benefits associated with the product and those considered important by the target group. This process may be iterated for an even better outcome.

EXAMPLE

For example, for element S, which was 1 outdoor advertisement shown across the USA during 2009 for Vodka Product A, the performance results from the proposed process across a sample of 826 consumers are shown in Table 16 below.

Part of Table 15

| Element | Performance On Consumer Perceived Benefits % | | | | | | Branding & Exposure % | | Branded Exposure % | Total Volume Contribution % | Cost $USD Millions | ROI $ |
|---|---|---|---|---|---|---|---|---|---|---|---|---|
| | TR | SO | ID | SE | CR | CPBTS | EX | BR | | | | |
| P | 70 | 68 | 77 | 77 | 80 | 73.07 | 38 | 93 | 35 | 0.48 | 0.8 | 4.02 |
| S | 73 | 61 | 71 | 81 | 72 | 70.51 | 48 | 90 | 43 | 0.58 | 1.2 | 3.21 |

In summary, the process described in the enclosed claims:
Measures consumers' individual, unconscious responses to a marketing element, then converts it to sales and financial return on investment.
Shows the creative, media and consumer preference reasons for such performance that marketing personnel can use in their future marketing budget planning.
The same process or part of the same process of measuring finished marketing elements' affect on an individual consumer's unconscious can be applied to measuring the affect of an unfinished marketing concept or idea on a consumer's unconscious. In this way, the invention can be used in earlier stages of the marketing development cycle as input to the development of marketing activity.

The measure of a product and/or marketing element against each of one or more consumer perceived benefits determined by use of the method and/or computer based system may be used to adapt an existing product and/or marketing element. If a product and/or marketing element falls down on a CPB that is important, then it may be corrected accordingly. This may improve the product and/or marketing element so adapted. Similarly, a new product and/or marketing element may be designed using the method. An initial design may be tested and subsequently adapted. This may result in a highly effective and new product and/or marketing element. An individual consumer's unconscious can be applied to measuring the effect of an unfinished concept or idea on the consumer's unconscious. Embodiments of the

TABLE 16

Example performance results of Product A element S.

| Consumer Long-term Perspective | Creative Performance | Score Across Total Consumer Sample |
|---|---|---|
| | Consumer perceived benefit 1: Transformation | 73 |
| | Consumer perceived benefit 2: Socialization | 61 |
| | Consumer perceived benefit 3: Identity | 71 |
| | Consumer perceived benefit 4: Sensory Experience | 81 |
| | Consumer perceived benefit 5: Credentials | 72 |
| | Branding % | 90 |
| | Media Performance Exposure % | 48 |
| | % Volume Generated (of total brand) | 0.58 |
| Financial Short-term Perspective | | $USDM |
| | Element Cost | 1.2 |
| | Element Sales Generated | 4.0 |
| | $Return On Investment (as a total of 1, where >1 = a positive return, 1 = no loss or gain and <1 = a negative return) | 3.21 |

The table indicates that for every dollar invested in element S, Product A generated $3.21, which meant a gain of $2.21 per dollar spent. This is an excellent return on investment.

Element S also delivered well from the consumer long-term perspective, as it generated 0.58% of Product A's total volume sold to date. Usually, in total, marketing plans in a pre-determined time period, e.g. 1 year, may generate between 2-8% of a brand's total sales each year. Typically there are between 15-40 elements in an annual marketing plan. For 1 element to generate 0.58% on its own is a good result.

The key reasons for Element S's strong financial and consumer performance were its strong delivery on consumer perceived benefit number 4, Sensory Experience (81), and number 1, Transformation (73), but more importantly, its strong branding performance (90).

Now that embodiments have been described, it will be appreciated that some embodiments have some of the following advantages:

- Some embodiments may be robust to sales that are affected by many, more significantly influential factors outside marketing elements, for example, other organizational initiatives that fall outside the marketing department such as the distribution of the product or service, the quality of the product or service and the visibility of the product in store to name a few.
- Some embodiments may be robust to factors outside of the organization itself that can greatly influence sales, for example, the season of the year. The method presented does not merely isolate the correlation between a small input variable (such as a marketing element) and sales, in the context of other, larger, more influential variables such as those mentioned, which would be frequently erroneous.
- Embodiments of the method of analysis between spend and sales may provide a mere short-term financial perspective of the effectiveness of the element because its input variables, that being spend, is an inherent financial variable which presents an incomplete picture in being short-term.
- Some embodiments may be robust to financial performance only. Usually when financial performance is strong, consumer performance is also strong, however the reverse is not always the case.
- Some embodiments may provide reasons behind both the short-term financial and consumer long-term performances, which is truly useful information that can be used by organizations to invest appropriately in the future. Typically it is difficult to isolate the relationship between the marketing element and sales in the context of other, larger, more influential variables. This is further clouded by the fact that the marketing element spend variable is not the actual spend on the element itself but rather spend on the media channel that the element was placed in, as this is all that is concretely available for the mathematical analysis. To illustrate with an example, it is the amount of money spent over 4 weekly periods on television versus radio, there having been 2 television commercials and 4 radio commercials on air during that 4-weekly period. A Market Mix Model will theoretically be able to isolate the influence of television versus radio on sales but not which specific piece of advertising within television and radio drove that sales effect. This creates a very big gap in understanding the effectiveness of the individual marketing elements. The 'creative effect' of marketing, i.e. the message of the advertisement, its direction, production values, tone, humor and branding, may be the key drivers of its long-term effectiveness versus the media channel which contained it. Market Mix Modeling cannot measure this creative effect.
- Some embodiments may measure the effect of an individual marketing element on an individual consumer's unconscious then convert that effect into the financial return on investment of the element. Embodiments may do this by mathematically linking the unconscious persuasion of the element to consumers' on-going liking/loyalty/consumption/purchase of the product, which can then be converted into a financial return on investment figure.
- Some embodiments, by capturing all of this information at the individual consumer and element levels, may micro analyze at the individual consumer and element levels and so smaller consumer group level analyses may be performed, in addition to more macro analyses. Examples of more macro analyses include the effect of combined elements in one media channel versus another, as well as the effect of combined elements in one campaign versus another, as well as the effect of elements on one group of consumers versus another or versus the total consumer sample.
- Some embodiments may ameliorate the issue of isolating the effect of a marketing element on sales, as this measurement may be taken directly between the consumer, the element and their on-going liking/loyalty/consumption/purchase of the product.
- Some embodiments may ameliorate the issue of providing only a short-term financial perspective as this analysis starts with the consumer's long-term perspective, then moves through to the short-term financial perspective, which obviously means that both perspectives are provided.
- Some embodiments, by capturing the element's performance on the consumer perceived benefits of the category in question, branding and exposure, may provide each element's creative versus media reasons for performance.

It will be appreciated that numerous variations and/or modifications may be made to the invention as shown in the specific embodiments without departing from the spirit or scope of the invention as broadly described. The methods and systems may be used in relation to any suitable product and/or service category such as dry-cleaning, cars, clothing, mobile telephones, consumer electronics etc. and is not limited to the example of Vodka. The present embodiments are, therefore, to be considered in all respects as illustrative and not restrictive.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A computer-implemented method of generating a measure of effectiveness of a marketing element for a product belonging to a product category, the method comprising:

generating, by a marketing element rating data generator of a computer system, marketing element rating data representing a measure of how well category products and/or category marketing elements measure against each of one or more consumer perceived benefits that consumers seek through purchase and/or consumption of the product, wherein the marketing element comprises a brand or packaging or advertising or promotions or events or innovation or concepts, or any combination thereof, wherein said one or more consumer perceived benefits comprise at least one unconscious benefit, the category products being products in the product category and the category marketing elements being marketing elements relating to products in the product category; and outputting said marketing element rating data to memory and/or a user interface, wherein generating said marketing element rating data comprises:

for each of the one or more consumers:

for each consumer perceived benefit, presenting to the consumer, via the user interface, a plurality of expressions in respect of the consumer perceived benefit; wherein said expressions comprise pictures, text, audio stimulus, moving footage audio-visual stimulus, smells, taste, textures or any combination thereof;

for each consumer perceived benefit, receiving from the consumer, via a user input means, expression rating data being a rating as to how well one or more of the plurality of expressions presented to the consumer represent the consumer perceived benefit; wherein receiving from the consumer said expression rating data comprises nominating from among said plurality of presented expressions at least one preferred expression representing said consumer perceived benefit;

presenting to the consumer, via the user interface, representations of the category products and/or category marketing elements;

for each consumer perceived benefit, receiving from the consumer, via the user input means, marketing element rating data representing how the consumer rates the category products and/or category marketing elements presented to the consumer against one or more of the nominated preferred expressions for which expression rating data was received:

the method further comprising obtaining consumer data comprising consumption and/or purchase data representing the one or more consumers' consumption level and/or purchase level of a plurality of products belonging to the product category and/or marketing elements in respect of those products belonging to the product category; and analysing the marketing element rating data and the corresponding consumer data to determine a relationship therebetween, wherein the relationship is indicative of the perceived benefit driving the consumption and/or purchase of the product and a measure of effectiveness of a marketing element for the product belonging to a product category; and outputting the determined relationship to memory and/or a user interface.

2. The method of claim 1, wherein analyzing the marketing element rating data and corresponding consumer data to determine a relationship therebetween includes:

generating, by a category importance generator of said computer system, importance data for each consumer perceived benefit, the importance data for a given consumer perceived benefit being a measure of importance of the consumer perceived benefit to the consumer in driving purchase and/or consumption of products and/or marketing elements within the product category; and outputting said importance data to said user interface and/or said memory.

3. The method of claim 2, wherein analysing the marketing element rating data and the corresponding consumer data further comprises performing a statistical analysis.

4. The method of claim 3, wherein performing the statistical analysis comprises determining a correlation between the marketing element rating data and the corresponding consumer data, the degree of correlation being indicative of the importance of the consumer perceived benefit to driving consumption and/or purchase of products and/or marketing elements within the product category.

5. The method of claim 4, wherein determining the correlation comprises performing a regression analysis.

6. The method of claim 5, wherein performing the regression analysis comprises performing a partial least squares regression analysis.

7. The method of claim 2, wherein analysing the marketing element rating data and the corresponding consumer data is confined to analysing data derived from consumers with one or more similarities.

8. The method of claim 7, further comprising generating, by a weighter of the computer system, weighted data for each of the one or more consumer perceived benefits in respect of a particular marketing element, the weighted data for a given consumer perceived benefit generated with reference to a combination of:

a given consumer's importance data in respect of the consumer perceived benefit; and the same consumer's marketing element rating data in respect of the consumer perceived benefit for the particular marketing element, and outputting said weighted data to said user interface and/or said memory.

9. The method of claim 8, further comprising generating, by a consumer data generator of the computer system, influence data for each of the one or more consumer perceived benefits, the influence data for a given consumer perceived benefit being a measure of the influence of the given consumer perceived benefit in driving the consumption and/or purchase of a particular marketing element; and outputting said influence data to said user interface and/or said memory.

10. The method of claim 9, wherein analysing how much each of the consumer perceived benefits drive consumption and/or purchase of the marketing element comprises statistically analyzing how much each of the consumer perceived benefits drive consumption and/or purchase of the marketing element.

11. The method of claim 10, wherein analysing how much each of the consumer perceived benefits drive consumption and/or purchase of the marketing element comprises determining a correlation between the weighted data and the consumer data for a particular marketing element.

12. The method of claim 11, wherein determining a correlation between the weighted data and the consumer data comprises performing a regression analysis for the particular marketing element.

13. The method claim 11, wherein determining a correlation between the weighted data and the consumer data comprises performing a partial least squares regression analysis for the particular marketing element.

14. The method of claim 2, further comprising
determining, by a marketing elements product sales generator of said computer system, sales proportion data in respect of the marketing element, the sales proportion data representing a proportion of sales of the product that are attributable to the marketing element; and
outputting said sales proportion data to said user interface and/or said memory.

15. The method of claim 14, wherein determining said sales proportion data comprises comparing product sales between consumers exposed versus not exposed to one or more marketing elements associated with products in the product category.

16. The method of claim 15, wherein determining sales proportion data further comprises
obtaining exposure data representing consumers' exposure to each of the one or more marketing elements associated with the products in the product category;
obtaining branding and/or trademark data representing consumers' correct brand and/or trademark allocation to each of one or more of marketing elements associated with the products in the product category; and
analyzing said consumer perceived benefit influence data associated with the product, the marketing element rating data associated with the product, the exposure data, and the branding and/or trade mark data, to determine the proportion of product sales that are attributable to the marketing element.

17. The method of claim 16, further comprising
calculating, by a marketing elements product return on investment data generator of said computer system, return on investment data in respect of the marketing element; and
outputting said return on investment data to said user interface and/or said memory.

18. The method of claim 1; wherein said consumer data further comprises liking/loyalty data representing the one or more consumers' liking level and/or loyalty level of a plurality of products belonging to the product category and/or marketing elements in respect of those products belonging to the product category.

19. An apparatus for generating a measure of effectiveness of a marketing element for a product belonging to a product category, the apparatus comprising
at least one data processor;
a data bus coupled to said data processor;
said at least one data processor being configured to:
generate, by a marketing element rating data generator of a computer system, marketing element rating data representing a measure of how well category products and/or category marketing elements measure against each of one or more consumer perceived benefits that consumers seek through purchase and/or consumption of the product, wherein the marketing element comprises a brand or packaging or advertising or promotions or events or innovation or concepts, or any combination thereof; wherein said one or more consumer perceived benefits comprise at least one unconscious benefit, the category products being products in the product category and the category marketing elements being marketing elements relating to products in the product category; and
output said marketing element rating data to memory and/or a user interface,
wherein, in order to generate said marketing element rating data, said at least one data processor is configured to:
for each of one or more consumers:
for each consumer perceived benefit, present to the consumer, via the user interface, a plurality of expressions, wherein said expressions comprise pictures, text, audio stimulus, moving footage audio-visual stimulus, smells, taste, textures or any combination thereof;
in respect of the consumer perceived benefit;
for each consumer perceived benefit, receive from the consumer, via a user input means, expression rating data being a rating as to how well one or more of the plurality of expressions presented to the consumer represent the consumer perceived benefit; wherein receive from the consumer said expression rating data comprises nominate from among said plurality of presented expressions at least one preferred expression representing said consumer perceived benefit;
present to the consumer, via the user interface, representations of the category products and/or category marketing elements;
for each consumer perceived benefit, receive from the consumer, via the user input means, marketing element rating data representing how the consumer rates the category products and/or category marketing elements presented to the consumer against one or more of the nominated expressions for which expression rating data was received;
wherein said at least one processor is further configured to:
obtain consumer data comprising consumption and/or purchase data representing the one or more consumers' consumption level and/or purchase level of a plurality of products belonging to the product category and/or marketing elements in respect of those products belonging to the product category; and
analyse the marketing element rating data and the corresponding consumer data to determine a relationship therebetween, wherein the relationship is indicative of the perceived benefit driving the consumption and/or purchase of the product and a measure of effectiveness of a marketing element for the product belonging to a product category; and
output the determined relationship to memory and/or a user interface.

20. The apparatus of claim 19,
wherein analyse the marketing element rating data and corresponding consumer data to determine a relationship therebetween includes:
generate, by a category importance generator of said computer system, importance data for each consumer perceived benefit, the importance data for a given consumer perceived benefit being a measure of importance of the consumer perceived benefit to the consumer in driving purchase and/or consumption of products and/or marketing elements within the product category; and
output said importance data to said user interface and/or said memory.

21. The apparatus of claim 20,
wherein analyse the marketing element rating data and the corresponding consumer data further comprises perform a statistical analysis.

22. The apparatus of claim 20,
wherein analyse the marketing element rating data and the corresponding consumer data is confined to analyse data derived from consumers with one or more similarities.

23. The apparatus of claim 22, wherein said at least one processor is further configured to:
  generate, by a weighter of the computer system, weighted data for each of the one or more consumer perceived benefits in respect of a particular marketing element, the weighted data for a given consumer perceived benefit generated with reference to a combination of:
    a given consumer's importance data in respect of the consumer perceived benefit; and
    the same consumer's marketing element rating data in respect of the consumer perceived benefit for the particular marketing element, and
  output said weighted data to said user interface and/or said memory.

24. The apparatus of claim 23, wherein said at least one processor is further configured to:
  generate, by a consumer data generator of the computer system,
    influence data for each of the one or more consumer perceived benefits, the influence data for a given consumer perceived benefit being a measure of the influence of the given consumer perceived benefit in driving the consumption and/or purchase of a particular marketing element; and
    output said influence data to said user interface and/or said memory.

25. The apparatus of claim 24, wherein analyse how much each of the consumer perceived benefits drive consumption and/or purchase of the marketing element comprises statistically analyze how much each of the consumer perceived benefits drive consumption and/or purchase of the marketing element.

26. A computer-readable medium including contents that are configured to cause a computing system to generate a measure of effectiveness of a marketing element for a product belonging to a product category by a method comprising:
  generating, by a marketing element rating data generator of a computer system, marketing element rating data representing a measure of how well category products and/or category marketing elements measure against each of one or more consumer perceived benefits that consumers seek through purchase and/or consumption of the product, wherein the marketing element comprises a brand or packaging or advertising or promotions or events or innovation or concepts, or any combination thereof, wherein said one or more consumer perceived benefits comprise at least one unconscious benefit, the category products being products in the product category and the category marketing elements being marketing elements relating to products in the product category; and
  outputting said marketing element rating data to memory and/or a user interface,
  wherein generating said marketing element rating data comprises: for each of one or more consumers:
    for each consumer perceived benefit, presenting to the consumer, via the user interface, a plurality of expressions; wherein said expressions comprise pictures, text, audio stimulus, moving footage audio-visual stimulus, smells, taste, textures or any combination thereof; in respect of the consumer perceived benefit;
    for each consumer perceived benefit, receiving from the consumer, via a user input means, expression rating data being a rating as to how well one or more of the plurality of expressions presented to the consumer represent the consumer perceived benefit; wherein receiving from the consumer said expression rating data comprises nominating from among said plurality of presented expressions at least one preferred expression representing said consumer perceived benefit;
    presenting to the consumer, via the user interface, representations of the category products and/or category marketing elements;
    for each consumer perceived benefit, receiving from the consumer, via the user input means, marketing element rating data representing how the consumer rates the category products and/or category marketing elements presented to the consumer against one or more of the nominated preferred expressions for which expression rating data was received;
  the method further comprising:
    obtaining consumer data comprising consumption and/or purchase data representing the one or more consumers' consumption level and/or purchase level of a plurality of products belonging to the product category and/or marketing elements in respect of those products belonging to the product category; and
    analysing the marketing element rating data and the corresponding consumer data to determine a relationship therebetween, wherein the relationship is indicative of the perceived benefit driving the consumption and/or purchase of the product and a measure of effectiveness of a marketing element for the product belonging to a product category; and
    outputting the determined relationship to memory and/or a user interface.

27. The computer-readable medium of claim 26, wherein analyzing the marketing element rating data and corresponding consumer data to determine a relationship therebetween includes:
  generating, by a category importance generator of said computer system, importance data for each consumer perceived benefit, the importance data for a given consumer perceived benefit being a measure of importance of the consumer perceived benefit to the consumer in driving purchase and/or consumption of products and/or marketing elements within the product category; and
  outputting said importance data to said user interface and/or said memory.

28. The computer-readable medium of claim 27, wherein analysing the marketing element rating data and the corresponding consumer data further comprises performing a statistical analysis.

29. The computer-readable medium of claim 27, wherein analysing the marketing element rating data and the corresponding consumer data is confined to analysing data derived from consumers with one or more similarities.

30. The computer-readable medium of claim 29, the method further comprising
  generating, by a weighter of the computer system, weighted data for each of the one or more consumer perceived benefits in respect of a particular marketing element, the weighted data for a given consumer perceived benefit generated with reference to a combination of:
    a given consumer's importance data in respect of the consumer perceived benefit; and
    the same consumer's marketing element rating data in respect of the consumer perceived benefit for the particular marketing element, and
  outputting said weighted data to said user interface and/or said memory.

31. The computer-readable medium of claim 30, the method further comprising generating, by a consumer data generator of the computer system,
- influence data for each of the one or more consumer perceived benefits, the influence data for a given consumer perceived benefit being a measure of the influence of the given consumer perceived benefit in driving the consumption and/or purchase of a particular marketing element; and
- outputting said influence data to said user interface and/or said memory.

32. The computer-readable medium of claim 31, wherein analysing how much each of the consumer perceived benefits drive consumption and/or purchase of the marketing element comprises statistically analyzing how much each of the consumer perceived benefits drive consumption and/or purchase of the marketing element.

* * * * *